United States Patent
Fleming et al.

(10) Patent No.: US 9,942,341 B2
(45) Date of Patent: *Apr. 10, 2018

(54) APPLICATION AND/OR SERVER STABILITY IN SIGNALING OPTIMIZATION IN A WIRELESS NETWORK FOR TRAFFIC UTILIZING PROPRIETARY AND NON-PROPRIETARY PROTOCOLS

(71) Applicant: Seven Networks, LLC, Marshall, TX (US)

(72) Inventors: Michael Fleming, San Carlos, CA (US); Andrii Kokhanovskyi, San Carlos, CA (US); Abhay Nirantar, San Carlos, CA (US); Nariman D. Batlivala, San Carlos, CA (US); Ari Backholm, San Carlos, CA (US); Huajie Hu, San Carlos, CA (US); Jie Wei, San Carlos, CA (US)

(73) Assignee: Seven Networks, LLC, Marshall, TX (US)

( * ) Notice: Subject to any disclaimer, the term of this patent is extended or adjusted under 35 U.S.C. 154(b) by 756 days.

This patent is subject to a terminal disclaimer.

(21) Appl. No.: 14/474,231

(22) Filed: Sep. 1, 2014

(65) Prior Publication Data

US 2015/0067179 A1 Mar. 5, 2015

Related U.S. Application Data

(63) Continuation of application No. PCT/US2014/042017, filed on Jun. 11, 2014.
(Continued)

(51) Int. Cl.
*H04L 29/08* (2006.01)
*H04L 29/06* (2006.01)
*G06F 17/30* (2006.01)

(52) U.S. Cl.
CPC .......... *H04L 67/28* (2013.01); *G06F 17/3089* (2013.01); *H04L 65/105* (2013.01);
(Continued)

(58) Field of Classification Search
CPC . H04L 67/28; H04L 67/2819; H04L 67/2842; H04L 67/288; H04L 67/2828;
(Continued)

(56) References Cited

U.S. PATENT DOCUMENTS 6,366,947 B1 * 4/2002 Kavner ............ G06F 17/30902
707/E17.12
6,785,262 B1 8/2004 Yao et al.
(Continued)

FOREIGN PATENT DOCUMENTS

WO 2012018431 A1 2/2012

OTHER PUBLICATIONS

Examiner Interview Summary and Office Action for U.S. Appl. No. 13/844,726 dated Jun. 2, 2014.
(Continued)

*Primary Examiner* — Ramy M Osman
(74) *Attorney, Agent, or Firm* — NK Patent Law, PLLC

(57) ABSTRACT

According to one aspect, the subject matter described herein includes a method for signaling optimization in a wireless network utilizing proprietary and non-proprietary protocols. A first connection is established between an application on a mobile device and a local proxy on the mobile device, a second connection is established between the local proxy and a proxy server not located on the mobile device, and a third connection is established between the proxy server and a content server. A byte stream between client and server is communicated between the client and the server via the first,
(Continued)

second, and third connections. The mobile device performs signaling optimization to optimize traffic over the second connection.

15 Claims, 8 Drawing Sheets

Related U.S. Application Data

(60) Provisional application No. 61/833,796, filed on Jun. 11, 2013, provisional application No. 61/836,091, filed on Jun. 17, 2013.

(52) U.S. Cl.
CPC ............ *H04L 65/60* (2013.01); *H04L 67/141* (2013.01); *H04L 67/2819* (2013.01); *H04L 67/2842* (2013.01)

(58) Field of Classification Search
CPC ... H04L 67/2876; H04L 67/141; H04L 67/24; H04L 65/105; H04L 65/60; G06F 17/3089; G06F 17/30902
See application file for complete search history.

(56) References Cited

U.S. PATENT DOCUMENTS

| | | | | |
|---|---|---|---|---|
| 8,874,761 | B2* | 10/2014 | Backholm | H04L 65/4084 455/408 |
| 8,886,176 | B2* | 11/2014 | Luna | H04L 67/2842 455/422.1 |
| 8,918,871 | B1* | 12/2014 | Yoon | H04L 63/10 709/223 |
| 8,984,581 | B2* | 3/2015 | Luna | G06F 21/554 726/1 |
| 9,100,873 | B2* | 8/2015 | Luna | H04L 67/2876 |
| 9,325,600 | B2* | 4/2016 | Alisawi | |
| 9,716,663 | B2* | 7/2017 | Alisawi | H04L 67/2876 |
| 2001/0054087 | A1* | 12/2001 | Flom | G06F 17/3089 709/218 |
| 2004/0243703 | A1 | 12/2004 | Demmer et al. | |
| 2007/0206617 | A1* | 9/2007 | Andreasen | H04L 67/141 370/401 |
| 2009/0172802 | A1* | 7/2009 | Mosek | H04L 67/28 726/12 |
| 2009/0293000 | A1* | 11/2009 | Lepeska | G06F 17/30902 715/744 |
| 2010/0271947 | A1 | 10/2010 | Abdelal et al. | |
| 2011/0010471 | A1* | 1/2011 | Heidelberger | G06F 13/28 710/22 |
| 2011/0191463 | A1* | 8/2011 | Liu | G06F 15/16 709/224 |
| 2011/0231923 | A1 | 9/2011 | Bollay et al. | |
| 2012/0023226 | A1* | 1/2012 | Petersen | H04L 67/2847 709/224 |
| 2012/0135726 | A1* | 5/2012 | Luna | H04L 67/2842 455/422.1 |
| 2012/0144051 | A1 | 6/2012 | Butler et al. | |
| 2012/0176968 | A1 | 6/2012 | Luna | |
| 2012/0230186 | A1 | 9/2012 | Lee et al. | |
| 2012/0290717 | A1* | 11/2012 | Luna | H04L 67/2876 709/224 |
| 2012/0303834 | A1* | 11/2012 | Adam | H04L 65/4084 709/231 |
| 2013/0031599 | A1* | 1/2013 | Luna | G06F 21/60 726/1 |
| 2013/0067086 | A1 | 3/2013 | Hershko et al. | |
| 2013/0173756 | A1* | 7/2013 | Luna | H04L 67/2828 709/219 |
| 2013/0219138 | A1 | 8/2013 | Mandalia et al. | |
| 2014/0215082 | A1* | 7/2014 | Backholm | H04L 67/24 709/227 |
| 2014/0274090 | A1 | 9/2014 | Mitchell et al. | |
| 2014/0373095 | A1* | 12/2014 | Yoon | H04L 63/10 726/3 |
| 2015/0067179 | A1* | 3/2015 | Fleming | H04L 67/28 709/227 |
| 2015/0074266 | A1* | 3/2015 | Alisawi | H04L 67/2876 709/224 |
| 2015/0295845 | A1* | 10/2015 | Yoon | H04L 63/10 709/225 |
| 2017/0289051 | A1* | 10/2017 | Alisawi | H04L 67/2857 |

OTHER PUBLICATIONS

Office Action for U.S. Appl. No. 13/844,726 dated Jan. 6, 2014.
ISR for International Application No. PCT/US2014/042017 filed Jun. 11, 2014.
EPO, Extended European Search Report for European Patent Application No. 14810186.8, dated Oct. 31, 2016.
USPTO, Final Rejection in U.S. Appl. No. 15/099,183 dated Sep. 8, 2017.
USPTO, Non-Final Rejection in U.S. Appl. No. 15/659,520 dated Sep. 14, 2017.
USPTO, Notice of Allowance in U.S. Appl. No. 15/099,254, dated Mar. 15, 2017.

* cited by examiner

APPLICATION AND/OR SERVER STABILITY IN SIGNALING OPTIMIZATION IN A WIRELESS NETWORK FOR TRAFFIC UTILIZING PROPRIETARY AND NON-PROPRIETARY PROTOCOLS

PRIORITY CLAIM

This application is a continuation of International Patent Application Serial No. PCT/US14/42017, filed Jun. 11, 2014, which claims the benefit of U.S. Provisional Patent Application Ser. No. 61/833,796, filed Jun. 11, 2013, and U.S. Provisional Patent Application Ser. No. 61/836,091, filed Jun. 17, 2013, the disclosures of all three of which are incorporated herein by reference in their entireties.

TECHNICAL FIELD

This disclosure relates to signaling optimization in a wireless network. More specifically, it relates to signaling optimization in a wireless network for traffic utilizing proprietary and non-proprietary protocols.

BACKGROUND

An increasing amount of mobile traffic is moving to vendor-specific proprietary protocols. Examples include Google's traffic over TCP port 5228, WhatsApp, Urban Airship push notifications used by various application vendors, Skype, Yahoo Mail 2.0 etc. This means that more and more of the application traffic that causes signaling now includes significant contribution from proprietary protocols on top of traffic utilizing standardized protocols such as HTTP/HTTPS. Conventional optimization of signaling relies upon some understanding of the protocol being used. Thus, there is a clear need for the ability to optimize signaling even for arbitrary, proprietary, and/or non-standard protocols, e.g., where the underlying protocol definition may be unknown.

SUMMARY

The subject matter disclosed herein includes methods and systems for optimizing signaling in a wireless network that includes traffic utilizing arbitrary, proprietary, and/or non-standard protocols in addition to standard protocols.

According to one aspect, the subject matter described herein includes a method for signaling optimization in a wireless network utilizing proprietary and non-proprietary protocols. A first connection is established between an application on a mobile device and a local proxy on the mobile device, a second connection is established between the local proxy and a proxy server not located on the mobile device, and a third connection is established between the proxy server and a content server. A byte stream between client and server is communicated between the client and the server via the first, second, and third connections. The mobile device performs signaling optimization to optimize traffic over the second connection.

According to another aspect, the subject matter described herein includes a system for signaling optimization in a wireless network utilizing proprietary and non-proprietary protocols. The system includes a mobile device that includes a client application and a local proxy, the client and local proxy connected by a first connection, a remote proxy not located on the mobile device and connected to the local proxy by a second connection, and a server in a wireless network and connected to the remote proxy by a third connection. A byte stream is communicated between the client and the server via the first, second, and third connections. The mobile device performs signaling optimization to optimize traffic over the second connection.

According to another aspect, the subject matter described herein includes a computer program product for signaling optimization in a wireless network utilizing proprietary and non-proprietary protocols. The computer program product includes a non-transitory computer readable storage medium having computer readable code embodied therewith, the computer readable code configured for establishing a first connection between an application on a mobile device and a local proxy on the mobile device, establishing a second connection between the local proxy and a proxy server not located on the mobile device, establishing a third connection between the proxy server and a content server, communicating a byte stream between the client and the server via the first, second, and third connections, and performing, by the mobile device, signaling optimization to optimize traffic over the second connection.

BRIEF DESCRIPTION OF THE DRAWINGS

Embodiments of the subject matter described herein will now be explained with reference to the accompanying drawings, wherein the like reference numerals represent like parts, of which.

DETAILED DESCRIPTION

Figure 1A:
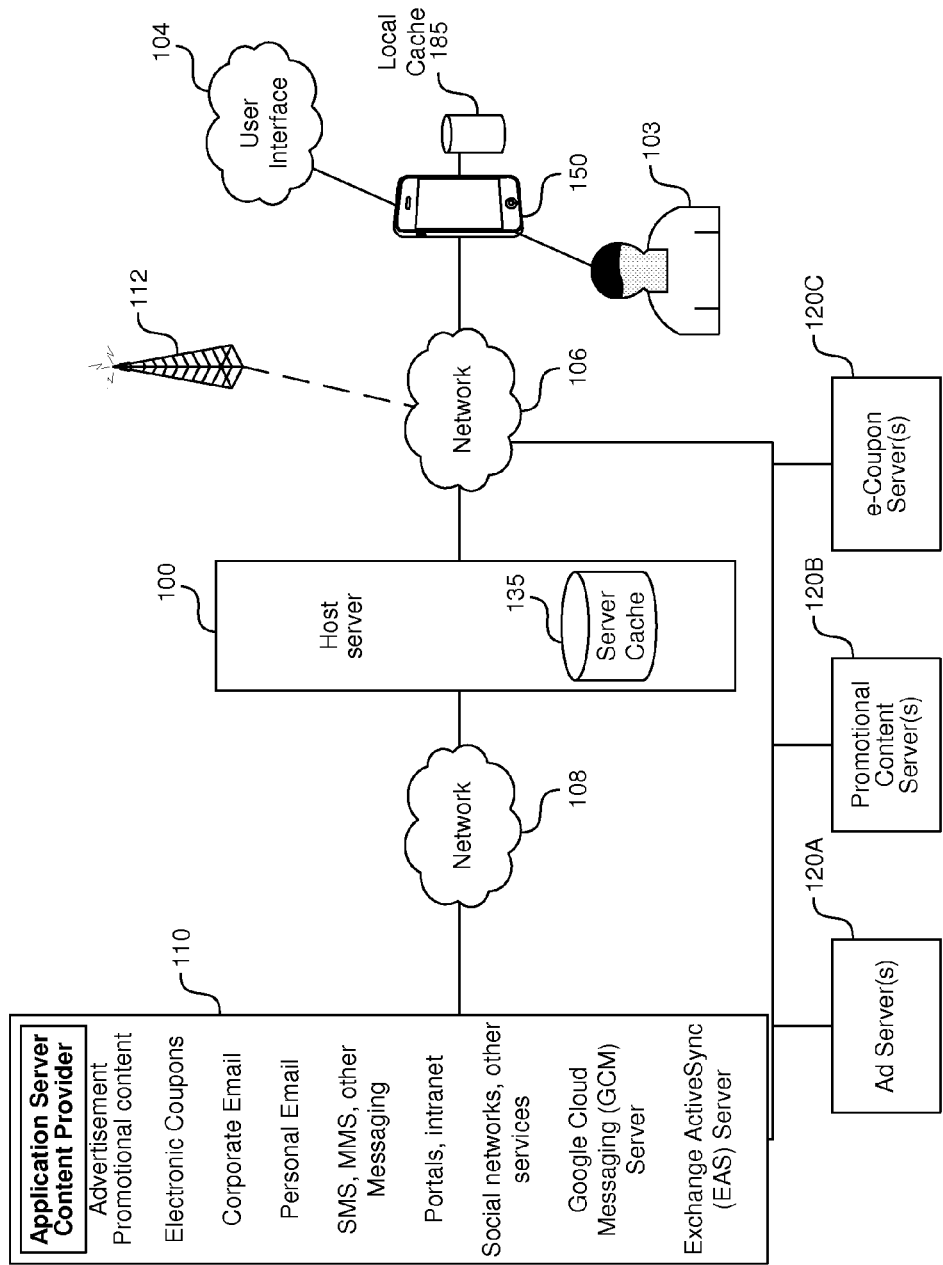
FIG. 1A is a block diagram illustrating an exemplary system for application and/or server stability in signaling optimization in a wireless network for traffic utilizing proprietary and non-proprietary protocols according to an embodiment of the subject matter described herein.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Existing signaling optimization systems and methods for reducing mobile network congestion can optimize mobile traffic over standard and non-proprietary application level protocols including, but not limited to: Hypertext Transfer Protocol (HTTP), Hypertext Transfer Protocol Secure (HTTPS), File Transfer Protocol (FTP), Simple Mail Transfer Protocol (SMTP), Internet Message Access Protocol (IMAP), Post Office Protocol (POP), and the like. However, many mobile applications are moving away from the standard protocols towards vendor specific proprietary protocols. For example, Google utilizes a non-standard Transmission Control Protocol (TCP) port 5228. By way of another example, the "WhatsApp" mobile application uses a customized version of the Extensible Messaging and Presence Protocol (XMPP). Similarly, some applications such as Skype and Yahoo mail use their own proprietary protocols, while others such as Urban Airship's push notifications protocol is used by various vendors.

Existing signaling optimization systems and methods replay or replicate entire transaction as instructed by a client, which means that the server performing the signal optimization needs to establish any session (TCP socket and any application level handshakes, Secure Sockets Layer (SSL), etc.) autonomously. However, to do so, the protocols must be well understood. For example, the header and other protocol specific data must be known before any optimization can be performed. As proprietary protocols are not standardized and not well understood, mobile traffic over such proprietary protocols cannot be optimized by existing optimization systems and methods.

Embodiment of the present disclosure includes systems and method for providing server stability for signaling optimization in a wireless network for traffic utilizing both proprietary and non-proprietary protocols. The disclosed technology includes an architecture (e.g., a distributed system comprised of a local proxy and/or a proxy server) that optimizes signaling for arbitrary, proprietary, and/or non-standard protocols, in addition to standard protocols such as HTTP, HTTPS, FTP, SMTP, POP, XMPP, and the like in one embodiment. In a further embodiment, the disclosed technology provides a protocol agnostic systems and methods for signaling optimization for any traffic in a wireless network, while keeping remote servers with which a client device communicates (e.g., the application server or content server, messaging server, and the like) happy.

In one embodiment, a Transmission Control Protocol (TCP) stream is passed as a byte stream from an application to a local proxy over a first session, from the local proxy to a proxy server over a second TCP session, and from the proxy server to a content server over a third TCP session. The local proxy observes and identifies patterns within the byte stream, without being aware of the underlying protocol. Once a pattern is identified, the second TCP session is torn down such that the first TCP session replays the pattern to the application, and third TCP session replays the pattern to the content server. Once either side detects a change in the pattern, the second TCP session is re-established to deliver the changed content to the other end.

When it is not possible to identify a pattern within a byte stream and perform a direct replay of the binary transactions, the disclosed innovation herein provides systems and method for providing or maintaining application and/or server stability which can optimize signaling in the wireless network for traffic utilizing various proprietary and non-proprietary protocols.

Figure 1B:
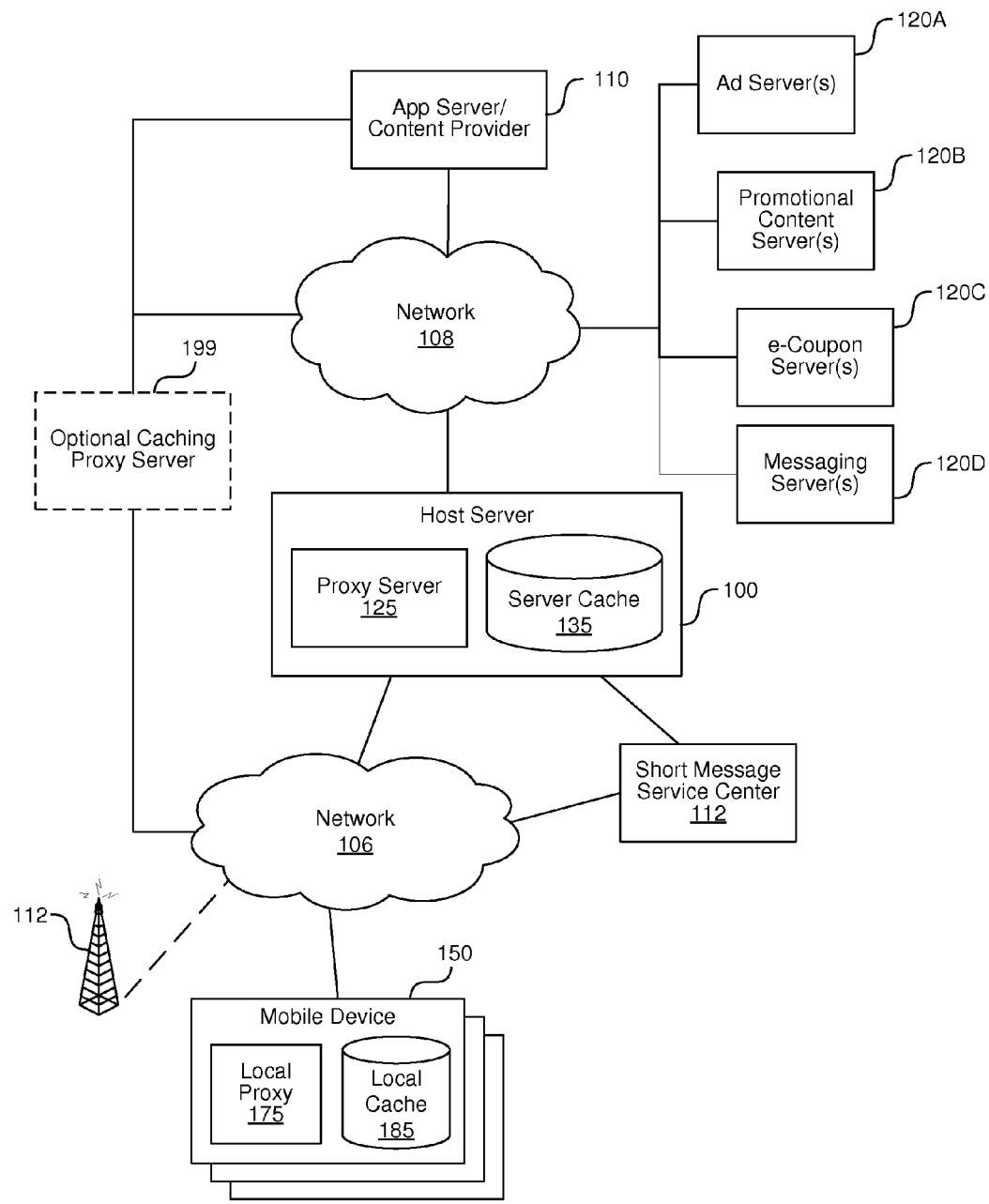
FIG. 1B is a block diagram illustrating an exemplary system for application and/or server stability in signaling optimization in a wireless network for traffic utilizing proprietary and non-proprietary protocols according to another embodiment of the subject matter described herein.

Embodiments of the present disclosure further include systems and methods for optimizing signaling in a wireless network for traffic utilizing proprietary and/or non-proprietary protocols by keeping a remote server (e.g., a messaging server, application server and/or content provider 110 of FIG. 1B) and/or applications on client devices "happy" (i.e., prevent the server from terminating the connection). The detailed description uses Google Cloud Messaging (GCM) server and Exchange ActiveSync server (or Microsoft Exchange Server) as examples of remote servers. However, other servers that communicate with applications/client devices may be applicable, and are contemplated.

The GCM server allows transfer of data from an application server or content provider to user devices using XMPP (upstream and downstream i.e., device to cloud and cloud to device). The GCM server can queue messages and deliver the messages to the target applications on the user device. These messages can inform the mobile application that there is new data to be fetched from the content provider or application server and/or can include actual data (e.g., instant messages). The EAS server allows for wireless synchronization of emails, calendars, contacts, and the like between an exchange server and a mobile device using an XML based protocol over HTTP or HTTPS. Various other intermediary or messaging servers that facilitate communication between applications on client devices and content provider or application servers are contemplated.

FIG. 1A illustrates an example diagram of a system where a host server 100 facilitates management of traffic, content caching, and/or resource conservation between mobile devices 150 (e.g., wireless devices), an application server 110 or content provider, or other servers such as an ad server 120A, promotional content server 120B, an e-coupon server 120C or messaging servers such as the Google Cloud Messaging (GCM) server and the Exchange ActiveSync (EAS) server in a wireless network (or broadband network) for resource conservation. The host server can further optimize signaling in a wireless network for traffic utilizing proprietary (non-standard) and non-proprietary (e.g., HTTP) protocols.

The client devices 150 can be any system and/or device, and/or any combination of devices/systems that is able to establish a connection, including wired, wireless, cellular connections with another device, a base station 112, a server and/or other systems such as host server 100 and/or application server/content provider 110. Client devices 150 will typically include a display and/or other output functionalities to present information and data exchanged between among the devices 150 and/or the host server 100 and/or application server/content provider 110. The application server/content provider 110 can by any server including third party servers or service/content providers further including advertisement, promotional content, publication, or electronic coupon servers or services. Similarly, separate advertisement servers 120A, promotional content servers 120B, and/or e-Coupon servers 120C as application servers or content providers are illustrated by way of example.

For example, the client/mobile devices 150 can include mobile, hand held or portable devices, wireless devices, or non-portable devices and can be any of, but not limited to, a server desktop, a desktop computer, a computer cluster, or portable devices, including a notebook, a laptop computer, a handheld computer, a palmtop computer, a mobile phone, a cell phone, a smart phone, a PDA, a Blackberry device, a Palm device, any tablet, a phablet (a class of smart phones with larger screen sizes between a typical smart phone and a tablet), a handheld tablet (e.g., an iPad, the Galaxy series, the Nexus, the Kindles, Kindle Fires, any Android-based tablets, Windows-based tablets, or any other tablet), any portable readers/reading devices, a hand held console, a hand held gaming device or console, a head mounted device, a head mounted display, a thin client or any SuperPhone such as the iPhone, and/or any other portable, mobile, hand held devices, or fixed wireless interface such as a M2M device, etc. In one embodiment, the client devices 150 (or mobile devices 150), host server 100, and application server 110 are coupled via a network 106 and/or a network 108. In some embodiments, the devices 150 and host server 100 may be directly connected to one another.

The input mechanism on client devices 150 can include touch screen keypad (including single touch, multi-touch, gesture sensing in 2D or 3D, etc.), a physical keypad, a mouse, a pointer, a track pad, a stylus, a stylus detector/sensor/receptor, motion detector/sensor (e.g., including 1-axis, 2-axis, 3-axis accelerometer, etc.), a face detector/recognizer, a retinal detector/scanner, a light sensor, capacitance sensor, resistance sensor, temperature sensor, proximity sensor, a piezoelectric device, device orientation detector (e.g., electronic compass, tilt sensor, rotation sensor, gyroscope, accelerometer), or any combination of the above.

Signals received or detected indicating user activity at client devices 150 through one or more of the above input mechanism, or others, can be used in the disclosed technology in acquiring context awareness at the client device 150. Context awareness at client devices 150 generally includes, by way of example but not limitation, client device 150 operation or state acknowledgement, management, user activity/behavior/interaction awareness, detection, sensing, tracking, trending, and/or application (e.g., mobile applications) type, behavior, activity, operating state, etc.

Context awareness in the present disclosure also includes knowledge and detection of network side contextual data and can include network information such as network capacity, bandwidth, traffic, type of network/connectivity, and/or any other operational state data. Network side contextual data can be received from and/or queried from network service providers (e.g., cell provider 112 and/or Internet service providers) of the network 106 and/or network 108 (e.g., by the host server and/or devices 150). In addition to application context awareness as determined from the client 150 side, the application context awareness may also be received from or obtained/queried from the respective application/service providers 110 (by the host 100 and/or client devices 150).

The host server 100 can use, for example, contextual information obtained for client devices 150, networks 106/108, applications (e.g., mobile applications), application server/provider 110, or any combination of the above, to manage the traffic in the system to satisfy data needs of the client devices 150 (e.g., to satisfy application or any other request including HTTP request). In one embodiment, the traffic is managed by the host server 100 to satisfy data requests made in response to explicit or non-explicit user 103 requests and/or device/application maintenance tasks. The traffic can be managed such that network consumption, for example, use of the cellular network is conserved for effective and efficient bandwidth utilization. In addition, the host server 100 can manage and coordinate such traffic in the system such that use of device 150 side resources (e.g., including but not limited to battery power consumption, radio use, processor/memory use) are optimized with a general philosophy for resource conservation while still optimizing performance and user experience. The host server 100 may also indirectly manage traffic via creation, selection and/or deployment of traffic blocking policy for implementation on the mobile device in some embodiments.

For example, in context of battery conservation, the device 150 can observe user activity (for example, by observing user keystrokes, backlight status, or other signals via one or more input mechanisms, etc.) and alters device 150 behaviors. The device 150 can also request the host server 100 to alter the behavior for network resource consumption based on user activity or behavior.

In one embodiment, the traffic management for resource conservation and/or maintaining of server stability in signaling optimization is performed using a distributed system between the host server 100 and client device 150. The distributed system can include proxy server and cache components on the server side 100 and on the device/client side, for example, as shown by the server cache 135 on the server 100 side and the local cache 185 on the client 150 side.

Functions and techniques disclosed for context aware traffic management and providing server stability for resource conservation and reducing or optimizing signaling in networks (e.g., network 106 and/or 108) and devices 150, reside in a distributed proxy and cache system. The proxy and cache system can be distributed between, and reside on, a given client device 150 in part or in whole and/or host server 100 in part or in whole. The distributed proxy and cache system are illustrated with further reference to the example diagram shown in FIG. 1B. Functions and techniques performed by the proxy and cache components in the client device 150 and the related components therein are described, respectively, in detail with further reference to the examples of FIG. 2A.

In one embodiment, client devices 150 communicate with the host server 100 and/or the application server 110 over network 106, which can be a cellular network and/or a broadband network. To facilitate overall traffic management between devices 150 and various application servers/content providers 110 to implement network (bandwidth utilization) and device resource (e.g., battery consumption), the host server 100 can communicate with the application server/providers 110 over the network 108, which can include the Internet (e.g., a broadband network).

In general, the networks 106 and/or 108, over which the client devices 150, the host server 100, and/or application server 110 communicate, may be a cellular network, a broadband network, a telephonic network, an open network, such as the Internet, or a private network, such as an intranet and/or the extranet, or any combination thereof. For example, the Internet can provide file transfer, remote log in, email, news, RSS, cloud-based services, instant messaging, visual voicemail, push mail, VoIP, and other services through any known or convenient protocol, such as, but is not limited to the TCP/IP protocol, UDP, HTTP, DNS, FTP, UPnP, NSF, ISDN, PDH, RS-232, SDH, SONET, etc.

The networks 106 and/or 108 include any collection of distinct networks operating wholly or partially in conjunction to provide connectivity to the client devices 150 and the host server 100 and may appear as one or more networks to the serviced systems and devices. In one embodiment, communications to and from the client devices 150 can be achieved by, an open network, such as the Internet, or a private network, broadband network, such as an intranet and/or the extranet. In one embodiment, communications can be achieved by a secure communications protocol, such as secure sockets layer (SSL), or transport layer security (TLS).

In addition, communications can be achieved via one or more networks, such as, but are not limited to, one or more of WiMax, a Local Area Network (LAN), Wireless Local Area Network (WLAN), a Personal area network (PAN), a Campus area network (CAN), a Metropolitan area network (MAN), a Wide area network (WAN), a Wireless wide area network (WWAN), or any broadband network, and further enabled with technologies such as, by way of example, Global System for Mobile Communications (GSM), Personal Communications Service (PCS), Bluetooth, WiFi, Fixed Wireless Data, 2G, 2.5G, 3G (e.g., WCDMA/UMTS based 3G networks), 4G, IMT-Advanced, pre-4G, LTE Advanced, mobile WiMax, WiMax 2, WirelessMAN-Advanced networks, enhanced data rates for GSM evolution (EDGE), General packet radio service (GPRS), enhanced GPRS, iBurst, UMTS, HSPDA, HSUPA, HSPA, HSPA+, UMTS-TDD, 1×RTT, EV-DO, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wireless data networks, broadband networks, or messaging protocols.

FIG. 1B illustrates an example diagram of a proxy and cache system distributed between the host server and device which facilitates network traffic management between a device, an application server or content provider, or other servers such as an ad server, promotional content server, an e-coupon server or messaging servers such as the GCM server and the EAS server for resource conservation and content caching. The proxy system distributed among the host server and the device can further optimize signaling in a wireless network for traffic utilizing proprietary (non-standard) and non-proprietary (e.g., HTTP) protocols.

The distributed proxy and cache system can include, for example, the proxy server 125 (e.g., remote proxy) and the server cache, 135 components on the server side. The server-side proxy 125 and cache 135 can, as illustrated, reside internal to the host server 100. In addition, the proxy server 125 and cache 135 on the server-side can be partially or wholly external to the host server 100 and in communication via one or more of the networks 106 and 108. For example, the proxy server 125 may be external to the host server and the server cache 135 may be maintained at the host server 100. Alternatively, the proxy server 125 may be within the host server 100 while the server cache is external to the host server 100. In addition, each of the proxy server 125 and the cache 135 may be partially internal to the host server 100 and partially external to the host server 100. The application server/content provider 110 can by any server including third party servers or service/content providers further including advertisement, promotional content, publication, or electronic coupon servers or services. Similarly, separate advertisement servers 120A, promotional content servers 120B, e-Coupon servers 120C, and/or messaging servers (e.g., GCM, EAS servers) 120D as application servers or content providers are illustrated by way of example.

The distributed system can also, include, in one embodiment, client-side components, including by way of example but not limitation, a local proxy 175 (e.g., a mobile client on a mobile device) and/or a local cache 185, which can, as illustrated, reside internal to the device 150 (e.g., a mobile device).

In addition, the client-side proxy 175 and local cache 185 can be partially or wholly external to the device 150 and in communication via one or more of the networks 106 and 108. For example, the local proxy 175 may be external to the device 150 and the local cache 185 may be maintained at the device 150. Alternatively, the local proxy 175 may be within the device 150 while the local cache 185 is external to the device 150. In addition, each of the proxy 175 and the cache 185 may be partially internal to the host server 100 and partially external to the host server 100.

In one embodiment, the distributed system can include an optional caching proxy server 199. The caching proxy server 199 can be a component which is operated by the application server/content provider 110, the host server 100, or a network service provider 112, and or any combination of the above to facilitate network traffic management for network and device resource conservation. Proxy server 199 can be used, for example, for caching content to be provided to the device 150, for example, from one or more of, the application server/provider 110, host server 100, and/or a network service provider 112. Content caching can also be entirely or partially performed by the remote proxy 125 to satisfy application requests or other data requests at the device 150.

In context aware traffic management and optimization for resource conservation and/or server stability in signaling optimization in a network (e.g., cellular or other wireless networks), characteristics of user activity/behavior and/or application behavior at a mobile device (e.g., any wireless device) 150 can be tracked by the local proxy 175 and communicated, over the network 106 to the proxy server 125 component in the host server 100, for example, as connection metadata. The proxy server 125 which in turn is coupled to the application server/provider 110 provides content and data to satisfy requests made at the device 150. The local proxy 175 can be a protocol agnostic component that can identify a pattern within a byte stream and perform a direct replay of the binary transactions in one embodiment. In another embodiment, the local proxy 175 can maintain or provide application and/or server stability for signaling optimization in a wireless network utilizing proprietary and/or non-proprietary protocols.

In addition, the local proxy 175 can identify and retrieve mobile device properties, including one or more of, battery level, network that the device is registered on, radio state, signal strength, cell identifier (i.e., cell ID), location area code, or whether the mobile device is being used (e.g., interacted with by a user). In some instances, the local proxy 175 can delay, expedite (prefetch), and/or modify data prior to transmission to the proxy server 125, when appropriate, as will be further detailed with references to the description associated with the examples of FIG. 2A.

The local database 185 can be included in the local proxy 175 or coupled to the local proxy 175 and can be queried for a locally stored response to the data request prior to the data request being forwarded on to the proxy server 125. Locally cached responses can be used by the local proxy 175 to satisfy certain application requests of the mobile device 150, by retrieving cached content stored in the cache storage 185, when the cached content is still valid.

Similarly, the proxy server 125 of the host server 100 can also delay, expedite, or modify data from the local proxy prior to transmission to the content sources (e.g., the application server/content provider 110). In addition, the proxy server 125 uses device properties and connection metadata to generate rules for satisfying request of applications on the mobile device 150. The proxy server 125 can gather real time traffic information about requests of applications for later use in optimizing similar connections with the mobile device 150 or other mobile devices.

In general, the local proxy 175 and the proxy server 125 are transparent to the multiple applications executing on the mobile device. The local proxy 175 is generally transparent to the operating system or platform of the mobile device and may or may not be specific to device manufacturers. In some instances, the local proxy 175 is optionally customizable in part or in whole to be device specific. In some embodiments, the local proxy 175 may be bundled into a wireless model, a firewall, and/or a router.

In one embodiment, the host server 100 can in some instances, utilize the store and forward functions of a short message service center (SMSC) 114, such as that provided by the network service provider, in communicating with the device 150 in achieving network traffic management. Note that SMSC 114 can also utilize any other type of alternative channel including USSD or other network control mechanisms. The host server 100 can forward content or HTTP responses to the SMSC 114 such that it is automatically forwarded to the device 150 if available, and for subsequent forwarding if the device 150 is not currently available.

In general, the disclosed distributed proxy and cache system allows optimization of network usage, for example, by serving requests from the local cache 185, the local proxy 175 reduces the number of requests that need to be satisfied over the network 106. Further, the local proxy 175 and the proxy server 125 may filter irrelevant data from the communicated data. In addition, the local proxy 175 and the proxy server 125 can also accumulate low priority data and send it in batches to avoid the protocol overhead of sending individual data fragments. The local proxy 175 and the proxy server 125 can also compress or transcode the traffic, reducing the amount of data sent over the network 106 and/or 108. The signaling traffic in the network 106 and/or 108 can be reduced, as the networks are now used less often and the network traffic can be synchronized among individual applications.

With respect to the battery life of the mobile device 150, by serving application or content requests from the local cache 185, the local proxy 175 can reduce the number of times the radio module is powered up. The local proxy 175 and the proxy server 125 can work in conjunction to accumulate low priority data and send it in batches to reduce the number of times and/or amount of time when the radio is powered up. The local proxy 175 can synchronize the network use by performing the batched data transfer for all connections simultaneously. Furthermore, by preventing the mobile device from constantly attempting to signal the network that is congested, and/or allowing selective (e.g., high priority traffic) towards the network, the local proxy 175 can conserve battery resources of the mobile device.

Figure 1C:
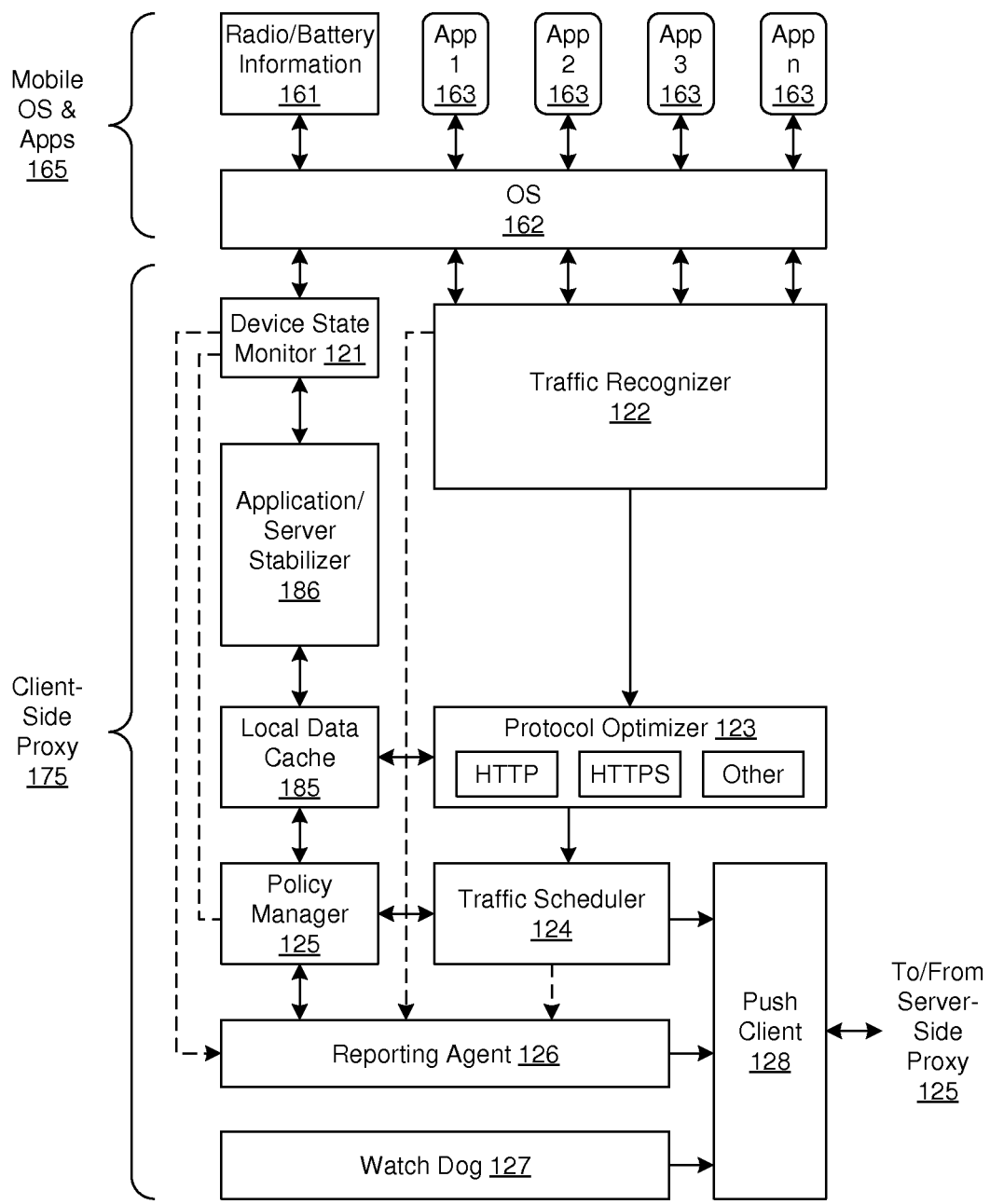
FIG. 1C is a block diagram illustrating an architecture of client side components in an exemplary system for application and/or server stability in signaling optimization in a wireless network for traffic utilizing proprietary and non-proprietary protocols according to another embodiment of the subject matter described herein.

FIG. 1C illustrates an example diagram showing the architecture of client side components in a distributed proxy and cache system having an application/server stabilizer component for optimizing signaling in a wireless network for traffic utilizing proprietary (non-standard) and non-proprietary (e.g., HTTP) protocols.

The client side proxy components 175 can include software components or agents installed on the mobile device that enables traffic optimization and performs the related functionalities on the client side. Components of the client side proxy 175 can operate transparently for end users and applications 163, and interface with the device's operating system (OS) 162. The client side proxy 175 can be installed on mobile devices for optimization to take place, and it can effectuate changes on the data routes and/or timing. Once data routing is modified, the client side proxy 175 can respond to application requests to service providers or host servers, in addition to or instead of letting those applications 163 access data network directly. In general, applications 163 on the mobile device will not notice that the client side proxy 175 is responding to their requests.

Some example components of the client side proxy 175 are described as follows:

Device State Monitor 121: The device state monitor 121 can be responsible for identifying several states and metrics in the device, such as network status, display status, battery level (e.g., via the radio/battery information 161), etc., such that the remaining components in the client side proxy 175 can operate and make decisions according to device state, acting in an optimal way in each state.

Traffic Recognizer 122: The traffic recognizer 122 analyzes all traffic between the wireless device applications 163 and their respective host servers in order to identify recurrent patterns. Supported transport protocols include, for example, DNS, HTTP and HTTPS, such that traffic through those ports is directed to the client side proxy 175. While analyzing traffic, the client side proxy 175 can identify recurring polling patterns which can be candidates to be performed remotely by the server side proxy 125, and send to the protocol optimizer 123.

Protocol Optimizer 123: The protocol optimizer 123 can implement the logic of serving recurrent request from the local cache 185 instead of allowing those request go over the network to the service provider/application host server. One is its tasks is to eliminate or minimize the need to send requests to the network, positively affecting network congestion and device battery life.

Local Cache 185: The local cache 185 can store responses to recurrent requests, and can be used by the Protocol Optimizer 123 to send responses to the applications 163.

Traffic Scheduler 124: The traffic scheduler 124 can temporally move communications to optimize usage of device resources by unifying keep-alive signaling so that some or all of the different applications 163 can send keep-alive messages at the same time (traffic pipelining). Traffic scheduler 124 may also decide to delay transmission of data that is not relevant at a given time (for example, when the device is not actively used).

Policy Manager 129: The policy manager 129 can store and enforce traffic optimization and reporting policies provisioned by a Policy Management Server (PMS). At the client side proxy 175 first start, traffic optimization and reporting policies (policy profiles) that are to be enforced in a particular device can be provisioned by the Policy Management Server. Enforcing traffic management policies at the device's IP layer lets an operator manage traffic before it uses radio accessed network resources. Policy usage can range from creating highly targeted subscriber plans to proactively and/or reactively managing network congestion. In one implementation, the conditions for selecting a policy for enforcement, and/or conditions for dropping an implemented policy may be managed or coordinated by the policy manager 129.

Watch Dog 127: The watch dog 127 can monitor the client side proxy 175 operating availability. In case the client side proxy 175 is not working due to a failure or because it has been disabled, the watchdog 127 can reset DNS routing rules information and can restore original DNS settings for the device to continue working until the client side proxy 175 service is restored.

Reporting Agent 126: The reporting agent 126 can gather information (e.g., logs) about the events taking place in the device and send the information to a log storage and processing service, which may be internal to or external to service-side proxy 125 and which collects and stores client-side and/or server-side proxy system logs. Event details are stored temporarily in the device and transferred to the log storage and processing service only when the data channel state is active. If the client side proxy 175 does not send records within a period of time (e.g., twenty-four hours), the reporting agent 126 may, in one embodiment, attempt to open the connection and send recorded entries or, in case there are no entries in storage, an empty reporting packet. All reporting settings may be configured in the policy management server. The information in the logs may be used for reporting and/or troubleshooting, for example.

Push Client 128: The push client 128 can be responsible for the traffic between the server side proxy 125 and the client side proxy 175. The push client 128 can send out service requests like content update requests and policy update requests, and receives updates to those requests from the server side proxy 125. In addition, push client 128 may also send data to the log storage and processing service.

The proxy server 199 has a wide variety of uses, from speeding up a web server by caching repeated requests, to caching web, DNS and other network lookups for a group of clients sharing network resources. The proxy server 199 is optional. The distributed proxy and cache system (125 and/or 175) allows for a flexible proxy configuration using either the proxy 199, additional proxy(s) in operator's network, or integrating both proxies 199 and an operator's or other third-party's proxy.

The application/server stabilizer 186 can manage connection at the application and/or server level to prevent the application and/or server from terminating the connection, while minimizing or optimizing signaling between the application/device and the server. The functions and features of the application/server stabilizer 186 are described in detail in FIG. 2B.

Figure 2A:
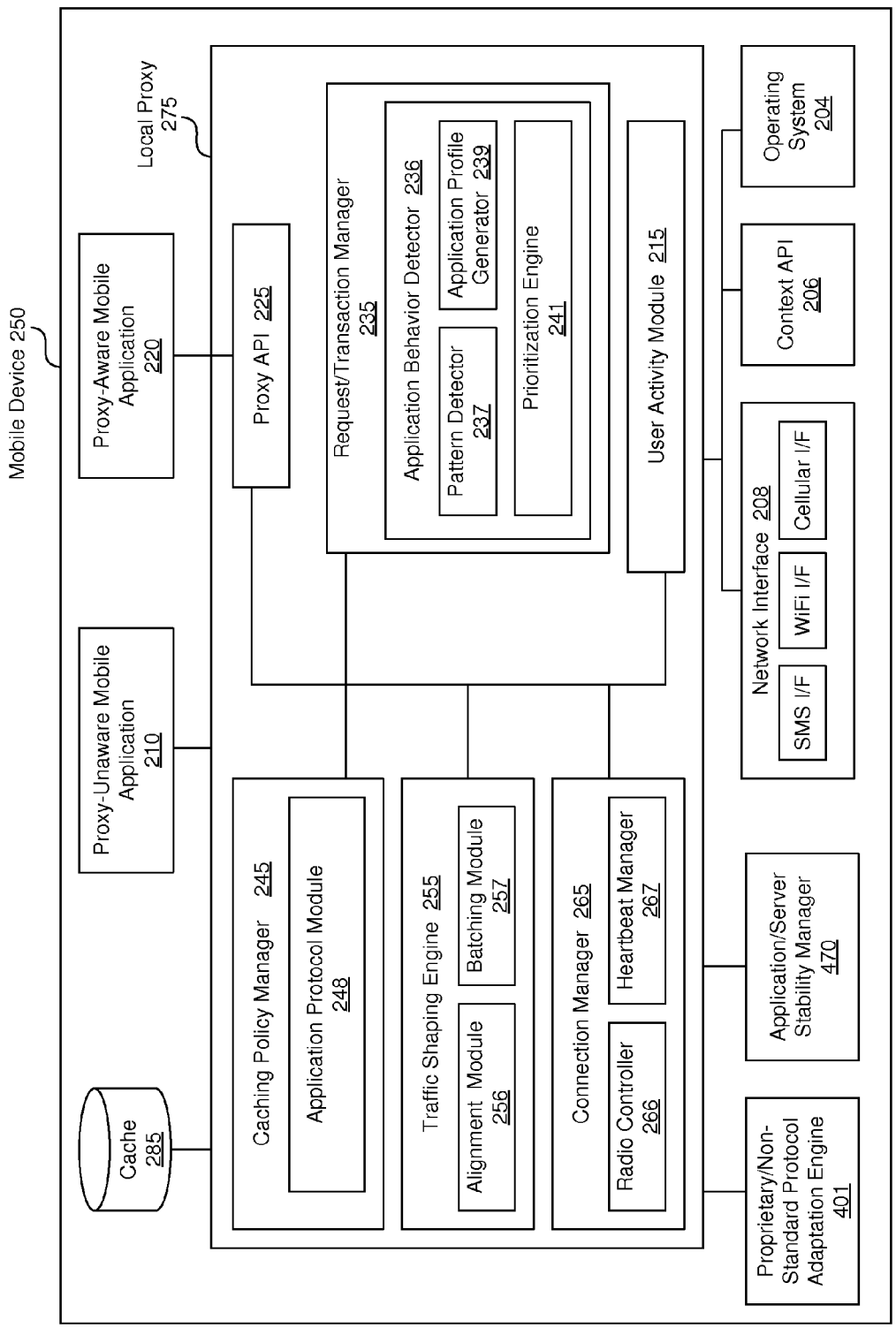
FIGS. 2A, 2B, and 2C are block diagrams illustrating an architecture of client side components in an exemplary system for application and/or server stability in signaling optimization in a wireless network for traffic utilizing proprietary and non-proprietary protocols according to yet another embodiment of the subject matter described herein.

FIG. 2A depicts a block diagram illustrating an example of client-side components in a distributed proxy and cache system residing on a mobile device (e.g., wireless device) 250 that manages traffic in a wireless network (or broadband network) for application/server stability, resource conservation, content caching, and/or traffic management. The client-side proxy (or local proxy 275) can further categorize mobile traffic and/or implement delivery policies based on application behavior, content priority, user activity, and/or user expectations.

The device 250, which can be a portable or mobile device (e.g., any wireless device), such as a portable phone, generally includes, for example, a network interface 208 an operating system 204, a context API 206, and mobile applications which may be proxy-unaware 210 or proxy-aware 220. Note that although device 250 is specifically illustrated in the example of FIG. 2A as a mobile device, such is not a limitation; device 250 may be any wireless, broadband, portable/mobile or non-portable device able to receive, transmit signals to satisfy data requests over a network including wired or wireless networks (e.g., WiFi, cellular, Bluetooth, LAN, WAN, etc.).

The network interface 208 can be a networking module that enables the device 250 to mediate data in a network with an entity that is external to the host server 250, through any known and/or convenient communications protocol supported by the host and the external entity. The network interface 208 can include one or more of a network adaptor card, a wireless network interface card (e.g., SMS interface, WiFi interface, interfaces for various generations of mobile communication standards including but not limited to 2G, 3G, 3.5G, 4G, LTE, etc.,), Bluetooth, or whether or not the connection is via a router, an access point, a wireless router, a switch, a multilayer switch, a protocol converter, a gateway, a bridge, a bridge router, a hub, a digital media receiver, and/or a repeater.

Device 250 can further include client-side components of the distributed proxy and cache system which can include, but are not limited to, a local proxy 275 (e.g., a mobile client of a mobile device) and a cache 285. In one embodiment, the local proxy 275 includes a user activity module 215, a proxy API 225, a request/transaction manager 235, a caching policy manager 245 having an application protocol module 248, a traffic shaping engine 255, and/or a connection manager 265. The traffic shaping engine 255 may further include an alignment module 256 and/or a batching module 257, the connection manager 265 may further include a radio controller 266 and a heartbeat manager 267. The request/transaction manager 235 can further include an application behavior detector 236 and/or a prioritization engine 241, the application behavior detector 236 may further include a pattern detector 237 and/or and application profile generator 239. The local proxy or the device can further include a proprietary/non-standard protocol adaptation engine 401 for optimizing traffic in a protocol agnostic manner, and/or an application/server stability manager 470 for maintaining or preventing termination of connection while optimizing signaling in the wireless network for traffic in a protocol agnostic manner. Additional or fewer components/modules/engines can be included in the local proxy 275 and each illustrated component.

As used herein, a "module," "a manager," a "handler," a "detector," an "interface," a "controller," a "normalizer," a "generator," an "invalidator," or an "engine" includes a general purpose, dedicated or shared processor and, typically, firmware or software modules that are executed by the processor. Depending upon implementation-specific or other considerations, the module, manager, handler, detector, interface, controller, normalizer, generator, invalidator, or engine can be centralized or its functionality distributed. The module, manager, handler, detector, interface, controller, normalizer, generator, invalidator, or engine can include general or special purpose hardware, firmware, or software embodied in a computer-readable (storage) medium for execution by the processor.

As used herein, a computer-readable medium or computer-readable storage medium is intended to include all mediums that are statutory (e.g., in the United States, under 35 U.S.C. 101), and to specifically exclude all mediums that are non-statutory in nature to the extent that the exclusion is necessary for a claim that includes the computer-readable (storage) medium to be valid. Known statutory computer-readable mediums include hardware (e.g., registers, random access memory (RAM), non-volatile (NV) storage, to name a few), but may or may not be limited to hardware.

In one embodiment, a portion of the distributed proxy and cache system for network traffic management resides in or is in communication with device 250, including local proxy 275 (mobile client) and/or cache 285. The local proxy 275 can provide an interface on the device 250 for users to access device applications and services including email, IM, voice mail, visual voicemail, feeds, Internet, games, productivity tools, or other applications, etc.

The proxy 275 is generally application independent and can be used by applications (e.g., both proxy-aware and proxy-unaware applications 210 and 220 and other mobile applications) to open TCP connections to a remote server (e.g., the server 100). In some instances, the local proxy 275 includes a proxy API 225 which can be optionally used to interface with proxy-aware applications 220 (or applications (e.g., mobile applications) on a mobile device (e.g., any wireless device)).

The applications 210 and 220 can generally include any user application, widgets, software, HTTP-based application, web browsers, video or other multimedia streaming or downloading application, video games, social network applications, email clients, RSS management applications, application stores, document management applications, productivity enhancement applications, etc. The applications can be provided with the device OS, by the device manufacturer, by the network service provider, downloaded by the user, or provided by others.

One embodiment of the local proxy 275 includes or is coupled to a context API 206, as shown. The context API 206 may be a part of the operating system 204 or device platform or independent of the operating system 204, as illustrated. The operating system 204 can include any operating system including but not limited to, any previous, current, and/or future versions/releases of, Windows Mobile, iOS, Android, Symbian, Palm OS, Brew MP, Java 2 Micro Edition (J2ME), Blackberry, etc.

The context API 206 may be a plug-in to the operating system 204 or a particular client/application on the device 250. The context API 206 can detect signals indicative of user or device activity, for example, sensing motion, gesture, device location, changes in device location, device backlight, keystrokes, clicks, activated touch screen, mouse click or detection of other pointer devices. The context API 206 can be coupled to input devices or sensors on the device 250 to identify these signals. Such signals can generally include input received in response to explicit user input at an input device/mechanism at the device 250 and/or collected from ambient signals/contextual cues detected at or in the vicinity of the device 250 (e.g., light, motion, piezoelectric, etc.).

In one embodiment, the user activity module 215 interacts with the context API 206 to identify, determine, infer, detect, compute, predict, and/or anticipate, characteristics of user activity on the device 250. Various inputs collected by the context API 206 can be aggregated by the user activity module 215 to generate a profile for characteristics of user activity. Such a profile can be generated by the user activity module 215 with various temporal characteristics. For instance, user activity profile can be generated in real-time for a given instant to provide a view of what the user is doing or not doing at a given time (e.g., defined by a time window, in the last minute, in the last 30 seconds, etc.), a user activity profile can also be generated for a 'session' defined by an application or web page that describes the characteristics of user behavior with respect to a specific task they are engaged in on the device 250, or for a specific time period (e.g., for the last 2 hours, for the last 5 hours).

Additionally, characteristic profiles can be generated by the user activity module 215 to depict a historical trend for user activity and behavior (e.g., 1 week, 1 mo., 2 mo., etc.). Such historical profiles can also be used to deduce trends of user behavior, for example, access frequency at different times of day, trends for certain days of the week (weekends or week days), user activity trends based on location data (e.g., IP address, GPS, or cell tower coordinate data) or changes in location data (e.g., user activity based on user location, or user activity based on whether the user is on the go, or traveling outside a home region, etc.) to obtain user activity characteristics.

In one embodiment, user activity module 215 can detect and track user activity with respect to applications, documents, files, windows, icons, and folders on the device 250. For example, the user activity module 215 can detect when an application or window (e.g., a web browser or any other type of application) has been exited, closed, minimized, maximized, opened, moved into the foreground, or into the background, multimedia content playback, etc.

In one embodiment, characteristics of the user activity on the device 250 can be used to locally adjust behavior of the device (e.g., mobile device or any wireless device) to optimize its resource consumption such as battery/power consumption and more generally, consumption of other device resources including memory, storage, and processing power. In one embodiment, the use of a radio on a device can be adjusted based on characteristics of user behavior (e.g., by the radio controller 266 of the connection manager 265) coupled to the user activity module 215. For example, the radio controller 266 can turn the radio on or off, based on characteristics of the user activity on the device 250. In addition, the radio controller 266 can adjust the power mode of the radio (e.g., to be in a higher power mode or lower power mode) depending on characteristics of user activity.

In one embodiment, characteristics of the user activity on device 250 can also be used to cause another device (e.g., other computers, a mobile device, a wireless device, or a non-portable device) or server (e.g., host server 100) which can communicate (e.g., via a cellular or other network) with the device 250 to modify its communication frequency with the device 250. The local proxy 275 can use the characteristics information of user behavior determined by the user activity module 215 to instruct the remote device as to how to modulate its communication frequency (e.g., decreasing communication frequency, such as data push frequency if the user is idle, requesting that the remote device notify the device 250 if new data, changed, data, or data of a certain level of importance becomes available, etc.).

In one embodiment, the user activity module 215 can, in response to determining that user activity characteristics indicate that a user is active after a period of inactivity, request that a remote device (e.g., server host server) send the data that was buffered as a result of the previously decreased communication frequency.

In addition, or in alternative, the local proxy 275 can communicate the characteristics of user activity at the device 250 to the remote device (e.g., host server 100) and the remote device determines how to alter its own communication frequency with the device 250 for network resource conservation and conservation of device 250 resources.

One embodiment of the local proxy 275 further includes a request/transaction manager 235, which can detect, identify, intercept, process, manage, data requests initiated on the device 250, for example, by applications 210 and/or 220, and/or directly/indirectly by a user request. The request/transaction manager 235 can determine how and when to process a given request or transaction, or a set of requests/transactions, based on transaction characteristics.

The request/transaction manager 235 can prioritize requests or transactions made by applications and/or users at the device 250, for example by the prioritization engine 241. Importance or priority of requests/transactions can be determined by the request/transaction manager 235 by applying a rule set, for example, according to time sensitivity of the transaction, time sensitivity of the content in the transaction, time criticality of the transaction, time criticality of the data transmitted in the transaction, and/or time criticality or importance of an application making the request.

In addition, transaction characteristics can also depend on whether the transaction was a result of user-interaction or other user-initiated action on the device (e.g., user interaction with an application (e.g., a mobile application)). In general, a time critical transaction can include a transaction resulting from a user-initiated data transfer, and can be prioritized as such. Transaction characteristics can also depend on the amount of data that will be transferred or is anticipated to be transferred as a result of the requested transaction. For example, the connection manager 265, can adjust the radio mode (e.g., high power or low power mode via the radio controller 266) based on the amount of data that will need to be transferred.

In addition, the radio controller 266/connection manager 265 can adjust the radio power mode (high or low) based on time criticality/sensitivity of the transaction. The radio controller 266 can trigger the use of high power radio mode when a time-critical transaction (e.g., a transaction resulting from a user-initiated data transfer, an application running in the foreground, any other event meeting a certain criteria) is initiated or detected.

In general, the priorities can be set by default, for example, based on device platform, device manufacturer, operating system, etc. Priorities can alternatively or in additionally be set by the particular application; for example, the Facebook application (e.g., a mobile application) can set its own priorities for various transactions (e.g., a status update can be of higher priority than an add friend request or a poke request, a message send request can be of higher priority than a message delete request, for example), an email client or IM chat client may have its own configurations for priority. The prioritization engine 241 may include set of rules for assigning priority.

The prioritization engine 241 can also track network provider limitations or specifications on application or transaction priority in determining an overall priority status for a request/transaction. Furthermore, priority can in part or in whole be determined by user preferences, either explicit or implicit. A user, can in general, set priorities at different tiers, such as, specific priorities for sessions, or types, or applications (e.g., a browsing session, a gaming session, versus an IM chat session, the user may set a gaming session to always have higher priority than an IM chat session, which may have higher priority than web-browsing session). A user can set application-specific priorities, (e.g., a user may set Facebook-related transactions to have a higher priority than LinkedIn-related transactions), for specific transaction types (e.g., for all send message requests across all applications to have higher priority than message delete requests, for all calendar-related events to have a high priority, etc.), and/or for specific folders.

The prioritization engine 241 can track and resolve conflicts in priorities set by different entities. For example, manual settings specified by the user may take precedence over device OS settings, network provider parameters/limitations (e.g., set in default for a network service area, geographic locale, set for a specific time of day, or set based on service/fee type) may limit any user-specified settings and/or application-set priorities. In some instances, a manual synchronization request received from a user can override some, most, or all priority settings in that the requested synchronization is performed when requested, regardless of the individually assigned priority or an overall priority ranking for the requested action.

Priority can be specified and tracked internally in any known and/or convenient manner, including but not limited to, a binary representation, a multi-valued representation, a graded representation and all are considered to be within the scope of the disclosed technology.

TABLE I

| Change (initiated on device) | Priority | Change (initiated on server) | Priority |
|---|---|---|---|
| Send email | High | Receive email | High |
| Delete email | Low | Edit email | Often not possible to sync (Low if possible) |
| (Un)read email | Low | | |
| Move message | Low | New email in deleted items | Low |
| Read more | High | | |
| Download attachment | High | Delete an email | Low |
| | | (Un)Read an email | Low |
| New Calendar event | High | Move messages | Low |
| Edit/change Calendar event | High | Any calendar change | High |
| | | Any contact change | High |

TABLE I-continued

| Change (initiated on device) | Priority | Change (initiated on server) | Priority |
| --- | --- | --- | --- |
| Add a contact | High | Wipe/lock device | High |
| Edit a contact | High | Settings change | High |
| Search contacts | High | Any folder change | High |
| Change a setting | High | Connector restart | High (if no changes nothing is sent) |
| Manual send/receive | High | | |
| IM status change | Medium | Social Network Status Updates | Medium |
| Auction outbid or change notification | High | Severe Weather Alerts | High |
| Weather Updates | Low | News Updates | Low |

Table I above shows, for illustration purposes, some examples of transactions with examples of assigned priorities in a binary representation scheme. Additional assignments are possible for additional types of events, requests, transactions, and as previously described, priority assignments can be made at more or less granular levels, e.g., at the session level or at the application level, etc.

As shown by way of example in the above table, in general, lower priority requests/transactions can include updating message status as being read or unread, deleting of messages, and deletion of contacts. Higher priority requests/transactions may include status updates, new IM chat message(s), new email, calendar event update/cancellation/deletion, an event in a mobile gaming session, or other entertainment related events, a purchase confirmation through a web purchase or online, request to load additional or download content, contact book related events, a transaction to change a device setting, location-aware or location-based events/transactions, or any other events/request/transactions initiated by a user or where the user is known to be, expected to be, or suspected to be waiting for a response, etc.

Inbox pruning events (e.g., email, or any other types of messages), are generally considered low priority and absent other impending events, generally will not trigger use of the radio on the device 250. Specifically, pruning events to remove old email or other content can be 'piggy backed' with other communications if the radio is not otherwise on, at the time of a scheduled pruning event. For example, if the user has preferences set to 'keep messages for 7 days old,' then instead of powering on the device radio to initiate a message delete from the device 250 the moment that the message has exceeded 7 days old, the message is deleted when the radio is powered on next. If the radio is already on, then pruning may occur as regularly scheduled.

The request/transaction manager 235 can use the priorities for requests (e.g., by the prioritization engine 241) to manage outgoing traffic from the device 250 for resource optimization (e.g., to utilize the device radio more efficiently for battery conservation). For example, transactions/requests below a certain priority ranking may not trigger use of the radio on the device 250 if the radio is not already switched on, as controlled by the connection manager 265. In contrast, the radio controller 266 can turn on the radio such a request can be sent when a request for a transaction is detected to be over a certain priority level.

In one embodiment, priority assignments (such as that determined by the local proxy 275 or another device/entity) can be used cause a remote device to modify the frequency with which it communicates with the mobile device or wireless device. For example, the remote device can be configured to send notifications to the device 250 when data of higher importance is available to be sent to the mobile device or wireless device, but not send notifications when only data of lower importance is available, for example.

In one embodiment, transaction priority can be used in conjunction with characteristics of user activity in shaping or managing traffic, for example, by the traffic shaping engine 255. For example, the traffic shaping engine 255 can, in response to detecting that a user is dormant or inactive, wait to send low priority transactions from the device 250, for a period of time. In addition, the traffic shaping engine 255 can allow multiple low priority transactions to accumulate for batch transferring from the device 250 (e.g., via the batching module 257). In one embodiment, the priorities can be set, configured, or readjusted by a user. For example, content depicted in Table I in the same or similar form can be accessible in a user interface on the device 250 and for example, used by the user to adjust or view the priorities.

The batching module 257 can initiate batch transfer based on certain criteria. For example, batch transfer (e.g., of multiple occurrences of events, some of which occurred at different instances in time) may occur after a certain number of low priority events have been detected, or after an amount of time elapsed after the first of the low priority event was initiated. In addition, the batching module 257 can initiate batch transfer of the cumulated low priority events when a higher priority event is initiated or detected at the device 250. Batch transfer can otherwise be initiated when radio use is triggered for another reason (e.g., to receive data from a remote device such as host server 100 or 300). In one embodiment, an impending pruning event (pruning of an inbox), or any other low priority events, can be executed when a batch transfer occurs.

In general, the batching capability can be disabled or enabled at the event/transaction level, application level, or session level, based on any one or combination of the following: user configuration, device limitations/settings, manufacturer specification, network provider parameters/limitations, platform-specific limitations/settings, device OS settings, etc. In one embodiment, batch transfer can be initiated when an application/window/file is closed out, exited, or moved into the background; users can optionally be prompted before initiating a batch transfer; users can also manually trigger batch transfers.

In one embodiment, the local proxy 275 locally reduces or alters radio use on the device 250 by caching data in the cache 285. When requests or transactions from the device 250 can be satisfied by content stored in the cache 285, the radio controller 266 need not activate the radio to send the request to a remote entity (e.g., the host server 100, a content provider/application server such as the server/provider 110 or the messaging server(s) such as the GCM and/or EAS servers). As such, the local proxy 275 can use the local cache 285 and the caching policy manager 245 to locally store data for satisfying data requests to eliminate or reduce the use of the device radio for conservation of network resources and device battery consumption.

In leveraging the local cache, once the request/transaction manager 235 intercepts a data request by an application on the device 250, the local repository 285 can be queried to determine if there is any locally stored response, and also determine whether the response is valid. When a valid response is available in the local cache 285, the response can be provided to the application on the device 250 without the device 250 needing to access the cellular network or wireless broadband network, such as networks 106 and 108, for example.

If a valid response is not available, the local proxy 275 can query a remote proxy to determine whether a remotely stored response is valid. If so, the remotely stored response (e.g., which may be stored on the server cache 135 or optional caching server 199) can be provided to the mobile device, possibly without the mobile device 250 needing to access the cellular network, thus relieving consumption of network resources.

If a valid cache response is not available, or if cache responses are unavailable for the intercepted data request, the local proxy 275 (or one of its components, such as the caching policy manager 245, for example) can send the data request to a remote proxy, such as proxy server 125 or caching proxy server 199, which forwards the data request to a content source (e.g., application server/content provider 110) and a response from the content source can be provided through the remote proxy. The cache policy manager 245 can manage or process requests that use a variety of protocols, including but not limited to HTTP, HTTPS, IMAP, POP, SMTP, XMPP, and/or ActiveSync. The caching policy manager 245 can locally store responses for data requests in the local database 285 as cache entries, for subsequent use in satisfying same or similar data requests.

The caching policy manager 245 can request that the remote proxy monitor responses for the data request and the remote proxy can notify the device 250 when an unexpected response to the data request is detected. In such an event, the cache policy manager 245 can erase or replace the locally stored response(s) on the device 250 when notified of the unexpected response (e.g., new data, changed data, additional data, etc.) to the data request. In one embodiment, the caching policy manager 245 is able to detect or identify the protocol used for a specific request, including but not limited to HTTP, HTTPS, IMAP, POP, SMTP, XMPP, and/or ActiveSync. In one embodiment, application specific handlers (e.g., via the application protocol module 248 of the caching policy manager 245) on the local proxy 275 allows for optimization of any protocol that can be port mapped to a handler in the distributed proxy (e.g., port mapped on the proxy server).

In one embodiment, the local proxy 275 notifies the remote proxy such that the remote proxy can monitor responses received for the data request from the content source for changed results prior to returning the result to the device 250, for example, when the data request to the content source has yielded same results to be returned to the mobile device. In general, the local proxy 275 can simulate application server responses for applications on the device 250, using locally cached content. This can prevent utilization of the cellular network for transactions where new/changed data is not available, thus freeing up network resources and preventing network congestion.

In one embodiment, the local proxy 275 includes an application behavior detector 236 to track, detect, observe, monitor, applications (e.g., proxy-aware and/or unaware applications 210 and 220) accessed or installed on the device 250. Application behaviors, or patterns in detected behaviors (e.g., via the pattern detector 237) of one or more applications accessed on the device 250 can be used by the local proxy 275 to optimize traffic in a wireless network needed to satisfy the data needs of these applications.

For example, based on detected behavior of multiple applications, the traffic shaping engine 255 can align content requests made by at least some of the applications over the network (wireless network) (e.g., via the alignment module 256). The alignment module 256 can delay or expedite some earlier received requests to achieve alignment. When requests are aligned, the traffic shaping engine 255 can utilize the connection manager to poll over the network to satisfy application data requests. Content requests for multiple applications can be aligned based on behavior patterns or rules/settings including, for example, content types requested by the multiple applications (audio, video, text, etc.), device (e.g., mobile or wireless device) parameters, and/or network parameters/traffic conditions, network service provider constraints/specifications, etc.

In one embodiment, the pattern detector 237 can detect recurrences in application requests made by the multiple applications, for example, by tracking patterns in application behavior. A tracked pattern can include, detecting that certain applications, as a background process, poll an application server regularly, at certain times of day, on certain days of the week, periodically in a predictable fashion, with a certain frequency, with a certain frequency in response to a certain type of event, in response to a certain type user query, frequency that requested content is the same, frequency with which a same request is made, interval between requests, applications making a request, or any combination of the above, for example.

Such recurrences can be used by traffic shaping engine 255 to offload polling of content from a content source (e.g., from an application server/content provider 110) that would result from the application requests that would be performed at the mobile device or wireless device 250 to be performed instead, by a proxy server (e.g., proxy server 125) remote from the device 250. Traffic shaping engine 255 can decide to offload the polling when the recurrences match a rule. For example, there are multiple occurrences or requests for the same resource that have exactly the same content, or returned value, or based on detection of repeatable time periods between requests and responses such as a resource that is requested at specific times during the day. The offloading of the polling can decrease the amount of bandwidth consumption needed by the mobile device 250 to establish a wireless (cellular or other wireless broadband) connection with the content source for repetitive content polls.

As a result of the offloading of the polling, locally cached content stored in the local cache 285 can be provided to satisfy data requests at the device 250, when content change is not detected in the polling of the content sources. As such, when data has not changed, application data needs can be satisfied without needing to enable radio use or occupying cellular bandwidth in a wireless network. When data has changed and/or new data has been received, the remote entity to which polling is offloaded, can notify the device 250. The remote entity may be the host server 100.

In one embodiment, the local proxy 275 can mitigate the need/use of periodic keep-alive messages (heartbeat messages) to maintain TCP/IP connections, which can consume significant amounts of power thus having detrimental impacts on mobile device battery life. The connection manager 265 in the local proxy (e.g., the heartbeat manager 267) can detect, identify, and intercept any or all heartbeat (keep-alive) messages being sent from applications.

The heartbeat manager 267 can prevent any or all of these heartbeat messages from being sent over the cellular, or other network, and instead rely on the server component of the distributed proxy system (e.g., shown in FIG. 1B) to generate and send the heartbeat messages to maintain a connection with the backend (e.g., application server/provider 110 in the example of FIG. 1A).

The local proxy 275 generally represents any one or a portion of the functions described for the individual managers, modules, and/or engines. The local proxy 275 and device 250 can include additional or less components; more or less functions can be included, in whole or in part, without deviating from the novel art of the disclosure.

Figure 2B:
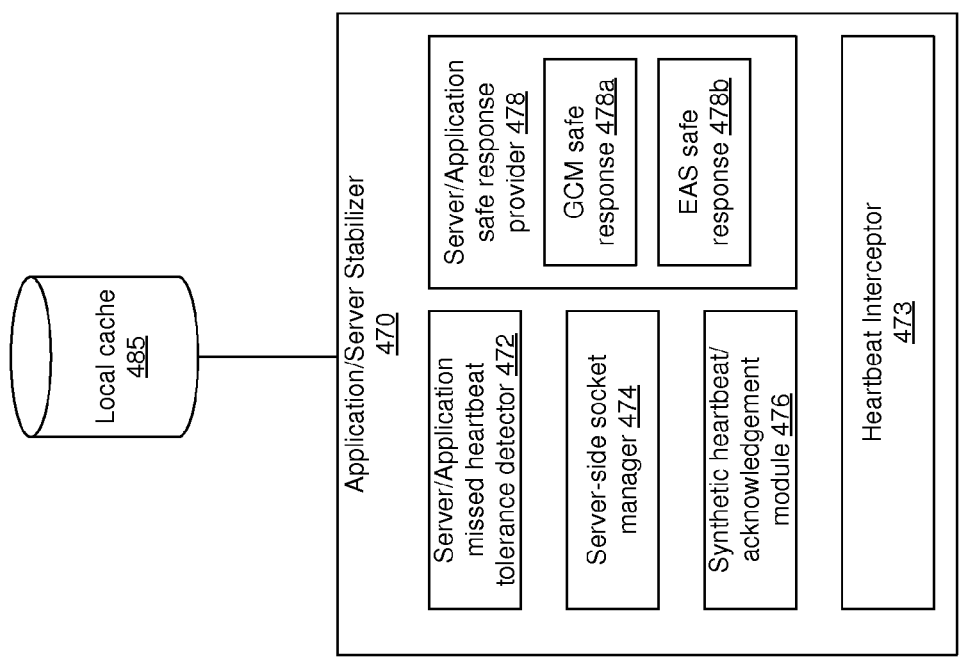

FIG. 2B depicts a block diagram illustrating additional components in the application/server stability manager 470 shown in the example of FIG. 2A.

The remote servers can maintain communication with the mobile device (e.g., mobile device 150 of FIG. 1A) via keepalives or heartbeats. the application/server stability manager 470 can identify the parameters for keeping the remote servers in a "happy" state while optimizing signaling in the network. In one embodiment, heartbeats to a remote server can be intercepted or suppressed (e.g., by a heartbeat interceptor/heartbeat manager 473) and the connection between the mobile device and the remote server (e.g., the GCM server) can be observed to determine the remote server's tolerance to a missed heartbeat (via the server/application missed heartbeat tolerance detector 472 for example). By way of example, if it is observed (e.g., over a number of heartbeat cycles) that the default heartbeat interval over cellular connection is 28 minutes and the connection is terminated by the GCM server at approximately 30 minutes of idle connection with a missed heartbeat, it can be determined that the GCM server allows a two minute grace period for an expected heartbeat. After the grace period is over, the GCM server explicitly terminates the connection with a server initiated reset or RST. The heartbeat interval, and the grace period associated with the remote server may vary with and can be determined for various connection types (e.g., Wi-Fi, 2/3G, 4G and the like) and network providers (e.g., AT&T, Sprint, and the like), for example. Using the tolerance value, the application/server stabilizer manager 470 can maximize the interval for sending a heartbeat, and thereby reduce signaling in the network.

In another embodiment, the server-side socket can be kept "happy" or non-idle even if an application-side socket is killed (via the server-side socket manager 474, for example), by implementing a strategy that defines period x1 and/or patterns z1 and z2, period x2 and period x3 for application y and port k (or port range). After a socket for application y, port k has been idle for longer than x1 seconds, or if traffic matches pattern z1, local proxy 275 does not send the data (e.g., keepalive) out to the network, until x2 seconds have passed from the first traffic after x1, and radio comes up for other reasons. (i.e., not before x2 has passed).

During the period of x3 from either "the first traffic after x1", or "when the application data was eventually sent to the network" (if application data was sent to the network before x3 from first traffic after x1), local proxy 275 does not relay the application data (but accepts the TCP socket and the payload from the application to the local proxy to avoid triggering port-hopping) to the network when application tries to use the same destination port k (even if IP address is different). This allows the server to be happy for x3, and extend that up to twice as long if a delayed keepalive is successfully sent to the network.

This strategy may be applicable when screen of the mobile device is off (e.g., as detected via the backlight detector 219 and/or application traffic categorizer 241D), to avoid affecting user interactive traffic. If the server responds with anything else than pattern z2 after the delayed keepalive was sent out to the network, the local proxy can attempt to get the application reconnect immediately by dropping the network-side socket, clearing any application-side blockings, dropping the application-side socket (assuming that the application has kept retrying opening new sockets continuously, and that a drop would trigger another reconnection attempt) and/or providing a connectivity intent to the application to allow the application to respond to the intent by attempting a reconnect. This allows the server to retry sending whatever data it was attempting to send using the newly established healthy socket from the application.

In another embodiment, an example method for keeping a remote server (e.g., GCM server) happy includes using a radio-up opportunity to send the remote server a synthetic heartbeat, which can be in addition to the synthetic acknowledgement or real acknowledgement (e.g., via the synthetic heartbeat/acknowledgement module 476). The example method removes the need for the connection termination and re-connection, and uses a suitably configured bounds to determine when the actual (e.g., GCM) heartbeat should be advanced.

In one embodiment, the distributed proxy can implement advancing of GCM heartbeats by keeping track of the TimeOfLastActivity on the connection and waits for the first heartbeat ping message. When it is received, it is sent across to server, and its corresponding acknowledgement is delivered back to the application. Concurrently, the difference of (TimeOfHPing−TimeOfLastActivity)=HeartbeatInterval is computed. the distributed proxy starts a timer for HeartbeatInterval, to send a Synthetic heartbeat ping to the server. It may try to send the synthetic ping, X seconds before the HeartBeatInterval, if the radio goes up. Otherwise it may send it after HeartbeatInterval expires. In the meantime, whenever the application sends a heartbeat ping, the distributed proxy can respond with a synthetic heartbeat acknowledgement. All other messages can pass through unobstructed.

The synthetic heartbeat/acknowledgement optimization can be enabled/disabled via policy configuration. Policy configuration includes tolerance window within which the prototype will seek radio up event. If one occurs, then it will send out the Synthetic HeartbeatPing early. For example, HeartbeatInterval=80 seconds, gcm_rseek_pc=25 then X=(80*0.25)=20 seconds. Then the distributed proxy will seek radio up events X=20 seconds before the HeartbeatInterval expires, and will send out the Synthetic HeartbeatPing early, if radio goes UP. The synthetic heartbeat pings/acks can be analyzed from the CRCS logs.

In one embodiment, the application/server stabilizer 470 can determine the parameters for keeping an application on the mobile device "happy." For example, an application may terminate a connection with a TLS close after a period of time (e.g., 1 minute) of sending a heartbeat and not receiving an acknowledgement.

The application can be kept "happy" by considering the network socket separately, which does not impact or minimally impacts end user experience in one embodiment. A "safe response" can be provided locally at the mobile device to the application, and outgoing non-keepalive messages would not be affected. A safe response compatible with EAS and GCM can be created and served whenever a certain criteria is met (e.g., when the screen is off) to keep the application happy (i.e., prevent the application from terminating the connection) (e.g., via the server/application safe response provider 478).

In one implementation, the local proxy can allow a request to go out every x minutes to avoid queuing unsynced data, and further to decide whether to send a long poll out. When a response comes back in, the proxy server or the local proxy can decide whether to serve the "safe response" at the local proxy so that caching can start if the responses are of "no news" type. In another implementation, the local proxy can simultaneously let a request go out to the network and provide a response to the application. When response from the content provider or application server comes back, the response can be examined to determine if the response is of "no news" or "news." If the response is of "news" type, the local proxy or the proxy server can determine how long to delay the new data (e.g., new emails) before delivering the real response from the network to the application.

For GCM server, where "news" is delivered independently of the keepalives, the GCM server can be kept happy as long as possible subject to grace period limitations, for example.

In another embodiment, in response to GCM heartbeats, the local proxy and/or the proxy server can intercept the GCM heartbeats and respond with a safe response such as a "no news" response when the screen of the mobile device is off (e.g., via the GCM safe response 478A). When the screen comes on, the connection to the GCM server is closed to cause the application to go out to the network.

For EAS, a similar safe response can be provided to reduce signaling due to the EAS protocol. While the screen is off, the local proxy and/or proxy server can respond to EAS ping, sync and/or foldersync requests with an EAS "no news" response. When the screen comes on or user activity is detected, the local proxy can cause the application to go out to the network (e.g., via the EAS safe response 478B). In a further implementation, the configurable intervals may be utilized when implementing the safe response strategy. For example, if the screen has been off for x seconds, the local proxy can cause the application to go out to the network, and then resume responding with "no news" response until next period passes. In another implementation, the intervals can be configured such that the local proxy responds with "no news" response for x seconds and then allows the application to go to the network for y seconds, repeating the cycle until the screen is off. In yet another implementation, when the screen comes on, the local proxy can continue serving "no news" response until the mail application (or another specified application) comes to the foreground.

In one embodiment, application level optimization may be performed by the distributed proxy for signaling optimization. Example optimizations performed for applications such as the Kik messenger and Wechat are described herein. However, such optimizations, and methods may be generalized, and applied to other applications.

In the example of Kik messenger, the application uses port 5223, and XML (XMPP) protocol over SSL. 1. Kik messenger sends periodic keep-alive messages to its server. The client sends "<ping/>" and the server responds with "<pong/>". The client starts off with a very short intervals (1, 2 seconds), but stabilize around 8 minutes (can be determined by the local proxy, for example). Kik messenger client has a 8 second tolerance for acknowledged ping messages. Without the corresponding "pong", client starts to terminate the current stream and start a new one after short amount of time (7-12 seconds). Kik messenger responds to synthesized ping/pong messages. Both client and server appears to be happy with synthesized keepalive messages. Kik messenger does not use GCM offloading when TCP connection to its server cannot go through. Given these observations or determinations, synthetic keepalive messages may be used:

1. On client side (in-socket), the local proxy can respond client "ping" requests with immediate "pong" messages.

2. On server side (out-socket), the proxy server can perform keepalives independent of client side, and exploit the following opportunities in one implementation:

(a) reduce keep-alive messages by eliminating unnecessary ones (e.g. ping/pong pairs shortly after a data packet)
(b) reduce number of keep-alive messages by adjusting the keep-alive frequency on the server side.
(c) seek opportunity for sending out keep-alive messages on server side when other applications cause the radio to be powered up or otherwise activated.

In order to enable optimization for applications that can tolerate/allow synthetic ping/pongs, policies in the Policy Management System (PMS) may need to be added or changed. For example, the application may need to be white listed (for decoding SSL traffic by the local proxy, for example) and synthetic keepalive (server-side) interval and keepalive tolerance percent may need to be configured. For example, if an application's stable keepalive interval is around 8 minutes, *+/−2 minutes may be used as synthetic keepalive window of opportunity. So, a 600 s long interval combined with 40% tolerance can provide the flexibility to send out synthetic keepalives between 6 and 10 minutes. It may be safer to increase the keepalive interval, up to the known carrier's network timeout in some implementations. For example, on Sprint devices, the setting can be increased to slightly less than 30 minutes, without significant loss of quality. The default of 600 s (8+/−2 minutes) may be selected in some cases to emulate the applications keep-alive intervals. The optimization may also be turned on or off via the PMS configuration.

In some applications (e.g., the Kik messenger) may require a force restart after upgrading the local proxy since some applications may start a DNS query before the local proxy comes up, the application's connection is long lived, and/or the application may cache its own DNS results some times.

The CRCS log can be analyzed to identify/detect synthetic acknowledgement messages to the application. The synthetic acknowledgement message may have specific to-app and from/to net byte counts (e.g., 28 to-app and 0 from/to net byte count for Kik messenger), indicator to indicate optimization enabled/disabled status, protocol field which can indicate whether the proxy server was able to decode the SSL session (e.g., if the DNS query did not reach the proxy server). The log can also include details regarding synthetic keepalive messages to origin sever (synthetic ping) which can include information such as from/to-app byte count (e.g. 0 for Kik messenger) and net byte count (e.g., 28 for Kik messenger). If radio alignment was, an indicator "RA[1]" in the analysis field may be present. Lack of this means radio did not come up in the tolerance window, and no optimization was achieved.

The experimental details of exchanging synthetic keepalives and acknowledgement messages as implemented for the Kik messenger may include the following.

1. Application sends periodic keep-alive messages with its server. Client sends "<ping/>" and server responds with "<pong/>".

2. Data capture (after SSL handshake), without interference. As far as keep-alive messages go, client starts off with a very short interval (1, 2 seconds), but stabilizes after around 8 minutes.

3. Drop Ping—test what happens when keepalive messages are dropped. Client behavior: client has a 8 second tolerance for server acknowledgement. Without server acknowledgement, client start to terminate the current stream and start a new one after short amount of time (7-12 seconds).

4. Delay Ping—test what happens when keepalive messages are delayed. Cannot test effectively because the app keeps dropping the connection when delay is more than 8 seconds.

5. Synthetic Pong: Setup: On application side (in socket) responds to client with synthetic acknowledge message. On server side (out socket) block ping from reaching server. Application is stable, and after sending the device a message after 15 minutes idle, the message reached the client successfully:

At the server, from time to time, the out socket read will get ETIMEDOUT or ECONNRST (ETIMEDOUT being the majority), but not any other messages. This may indicate that the periodic <ping/> message is not a requirement from server side.

In another example, an analysis of application "WeChat" for optimization is described herein. The distributed proxy can determine the server's heartbeat packet content, and if the application is detected as sending heartbeat packets during screen off, the distributed proxy can send a fake response to decrease the count of signal. In one implementation, a synthetic heartbeat plan may be implemented, where (1) when in pattern, the distributed proxy sends fake response to client; (2) when receiving new packet which is not heartbeat packet, the distributed proxy lets it go to server, resets the pattern; and (3) if received any packet from server which is not heartbeat packet, the distributed proxy lets it go to client, resets the pattern. In another implementation, the distributed proxy can determine the heartbeat interval (e.g., 6 min for Wechat). If the client sends a message that is not heartbeat, then the distributed proxy sends all the cached heartbeats, and this new packet to the server. Similarly, if the server sends a data packet, not heartbeat, the distributed proxy sends the new data packet to the client.

Figure 2C:
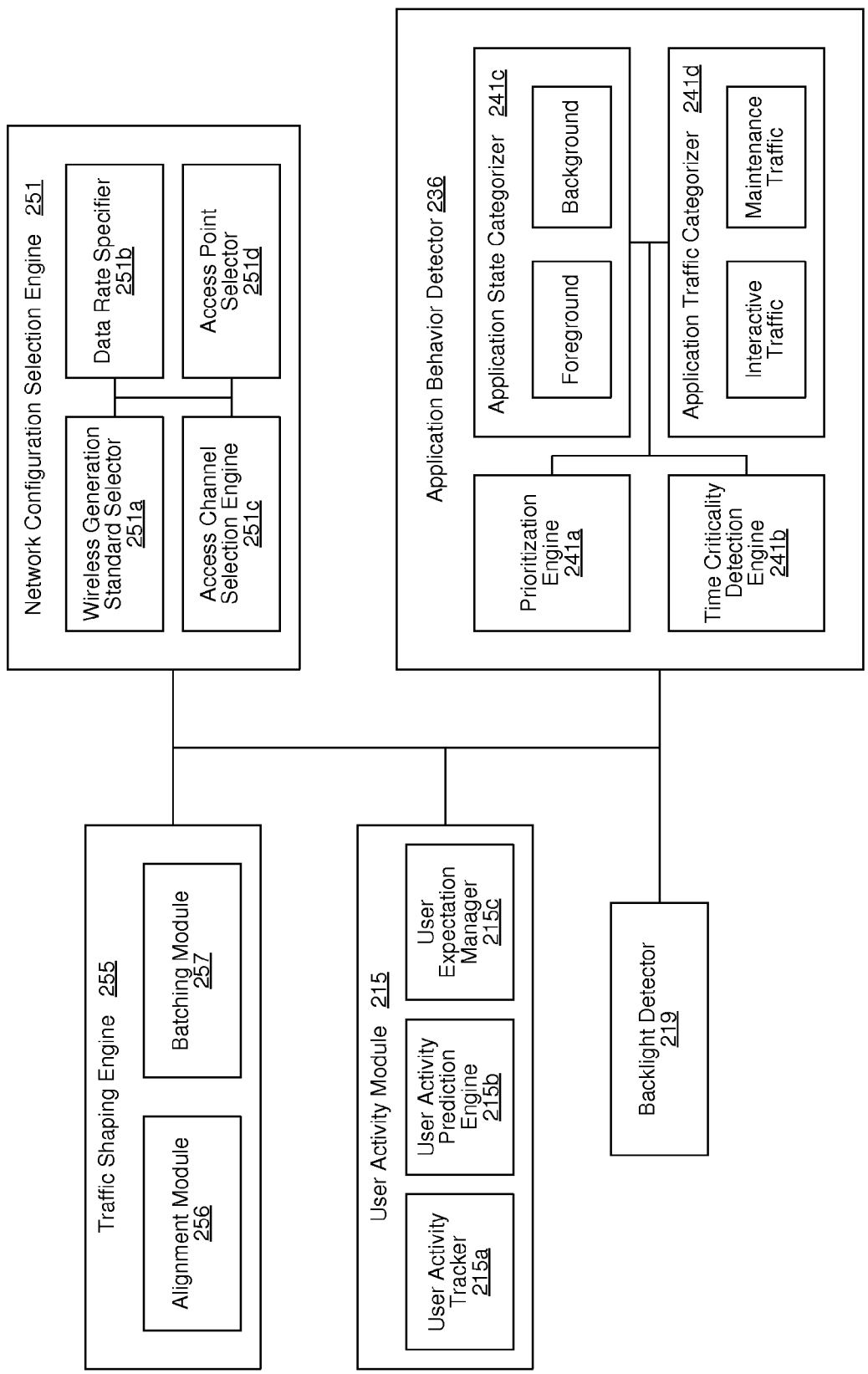

FIG. 2C depicts a block diagram illustrating examples of additional components of the client-side (or local) proxy of FIG. 2A which is further capable of performing mobile traffic categorization and policy implementation based on application behavior and/or user activity.

In this embodiment of the local proxy 275, the user activity module 215 further includes one or more of, a user activity tracker 215A, a user activity prediction engine 215B, and/or a user expectation manager 215C. The application behavior detect 236 can further include a prioritization engine 241A, a time criticality detection engine 241B, an application state categorizer 241D, and/or an application traffic categorizer 241D. The local proxy 275 can further include a backlight detector 219 and/or a network configuration selection engine 251. The network configuration selection engine 251 can further include, one or more of, a wireless generation standard selector 251A, a data rate specifier 251B, an access channel selection engine 251C, and/or an access point selector.

In one embodiment, the application behavior detector 236 is able to detect, determined, identify, or infer, the activity state of an application on the mobile device 250 to which traffic has originated from or is directed to, for example, via the application state categorizer 241D and/or the traffic categorizer 241D. The activity state can be determined by whether the application is in a foreground or background state on the mobile device (via the application state categorizer 241C) since the traffic for a foreground application vs. a background application may be handled differently.

In one embodiment, the activity state can be determined, detected, identified, or inferred with a level of certainty of heuristics, based on the backlight status of the mobile device 250 (e.g., by the backlight detector 219) or other software agents or hardware sensors on the mobile device, including but not limited to, resistive sensors, capacitive sensors, ambient light sensors, motion sensors, touch sensors, etc. In general, if the backlight is on, the traffic can be treated as being or determined to be generated from an application that is active or in the foreground, or the traffic is interactive. In addition, if the backlight is on, the traffic can be treated as being or determined to be traffic from user interaction or user activity, or traffic containing data that the user is expecting within some time frame.

In one embodiment, the activity state is determined based on whether the traffic is interactive traffic or maintenance traffic. Interactive traffic can include transactions from responses and requests generated directly from user activity/interaction with an application and can include content or data that a user is waiting or expecting to receive. Maintenance traffic may be used to support the functionality of an application which is not directly detected by a user. Maintenance traffic can also include actions or transactions that may take place in response to a user action, but the user is not actively waiting for or expecting a response.

For example, a mail or message delete action at a mobile device 250 generates a request to delete the corresponding mail or message at the server, but the user typically is not waiting for a response. Thus, such a request may be categorized as maintenance traffic, or traffic having a lower priority (e.g., by the prioritization engine 241A) and/or is not time-critical (e.g., by the time criticality detection engine 214B).

Contrastingly, a mail 'read' or message 'read' request initiated by a user a the mobile device 250, can be categorized as 'interactive traffic' since the user generally is waiting to access content or data when they request to read a message or mail. Similarly, such a request can be categorized as having higher priority (e.g., by the prioritization engine 241A) and/or as being time critical/time sensitive (e.g., by the time criticality detection engine 241B).

The time criticality detection engine 241B can generally determine, identify, infer the time sensitivity of data contained in traffic sent from the mobile device 250 or to the mobile device from a host server (e.g., host 300) or application server (e.g., app server/content source 110). For example, time sensitive data can include, status updates, stock information updates, IM presence information, email messages or other messages, actions generated from mobile gaming applications, webpage requests, location updates, etc. Data that is not time sensitive or time critical, by nature of the content or request, can include requests to delete messages, mark-as-read or edited actions, application-specific actions such as a add-friend or delete-friend request, certain types of messages, or other information which does not frequently changing by nature, etc. In some instances when the data is not time critical, the timing with which to allow the traffic to pass through is set based on when additional data needs to be sent from the mobile device 250. For example, traffic shaping engine 255 can align the traffic with one or more subsequent transactions to be sent together in a single power-on event of the mobile device radio (e.g., using the alignment module 256 and/or the batching module 257). The alignment module 256 can also align polling requests occurring close in time directed to the same host server, since these request are likely to be responded to with the same data.

In the alternate or in combination, the activity state can be determined from assessing, determining, evaluating, inferring, identifying user activity at the mobile device 250 (e.g., via the user activity module 215). For example, user activity can be directly detected and tracked using the user activity tracker 215A. The traffic resulting therefrom can then be categorized appropriately for subsequent processing to determine the policy for handling. Furthermore, user activity can be predicted or anticipated by the user activity prediction engine 215B. By predicting user activity or anticipating user activity, the traffic thus occurring after the prediction can be treated as resulting from user activity and categorized appropriately to determine the transmission policy.

In addition, the user activity module 215 can also manage user expectations (e.g., via the user expectation manager 215C and/or in conjunction with the activity tracker 215 and/or the prediction engine 215B) to ensure that traffic is categorized appropriately such that user expectations are generally met. For example, a user-initiated action should be analyzed (e.g., by the expectation manager 215) to determine or infer whether the user would be waiting for a response. If so, such traffic should be handled under a policy such that the user does not experience an unpleasant delay in receiving such a response or action.

In one embodiment, an advanced generation wireless standard network is selected for use in sending traffic between a mobile device and a host server in the wireless network based on the activity state of the application on the mobile device for which traffic is originated from or directed to. An advanced technology standards such as the 3G, 3.5G, 3G+, 4G, or LTE network can be selected for handling traffic generated as a result of user interaction, user activity, or traffic containing data that the user is expecting or waiting for. Advanced generation wireless standard network can also be selected for to transmit data contained in traffic directed to the mobile device which responds to foreground activities.

In categorizing traffic and defining a transmission policy for mobile traffic, a network configuration can be selected for use (e.g., by the network configuration selection engine 251) on the mobile device 250 in sending traffic between the mobile device and a proxy server (325) and/or an application server (e.g., app server/host 110). The network configuration that is selected can be determined based on information gathered by the application behavior module 236 regarding application activity state (e.g., background or foreground traffic), application traffic category (e.g., interactive or maintenance traffic), any priorities of the data/content, time sensitivity/criticality.

The network configuration selection engine 251 can select or specify one or more of, a generation standard (e.g., via wireless generation standard selector 251A), a data rate (e.g., via data rate specifier 251B), an access channel (e.g., access channel selection engine 251C), and/or an access point (e.g., via the access point selector 251D), in any combination.

For example, a more advanced generation (e.g., 3G, LTE, or 4G or later) can be selected or specified for traffic when the activity state is in interaction with a user or in a foreground on the mobile device. Contrastingly, an older generation standard (e.g., 2G, 2.5G, or 3G or older) can be specified for traffic when one or more of the following is detected, the application is not interacting with the user, the application is running in the background on the mobile device, or the data contained in the traffic is not time critical, or is otherwise determined to have lower priority.

Similarly, a network configuration with a slower data rate can be specified for traffic when one or more of the following is detected, the application is not interacting with the user, the application is running in the background on the mobile device, or the data contained in the traffic is not time critical. The access channel (e.g., Forward access channel or dedicated channel) can be specified.

Figure 3:
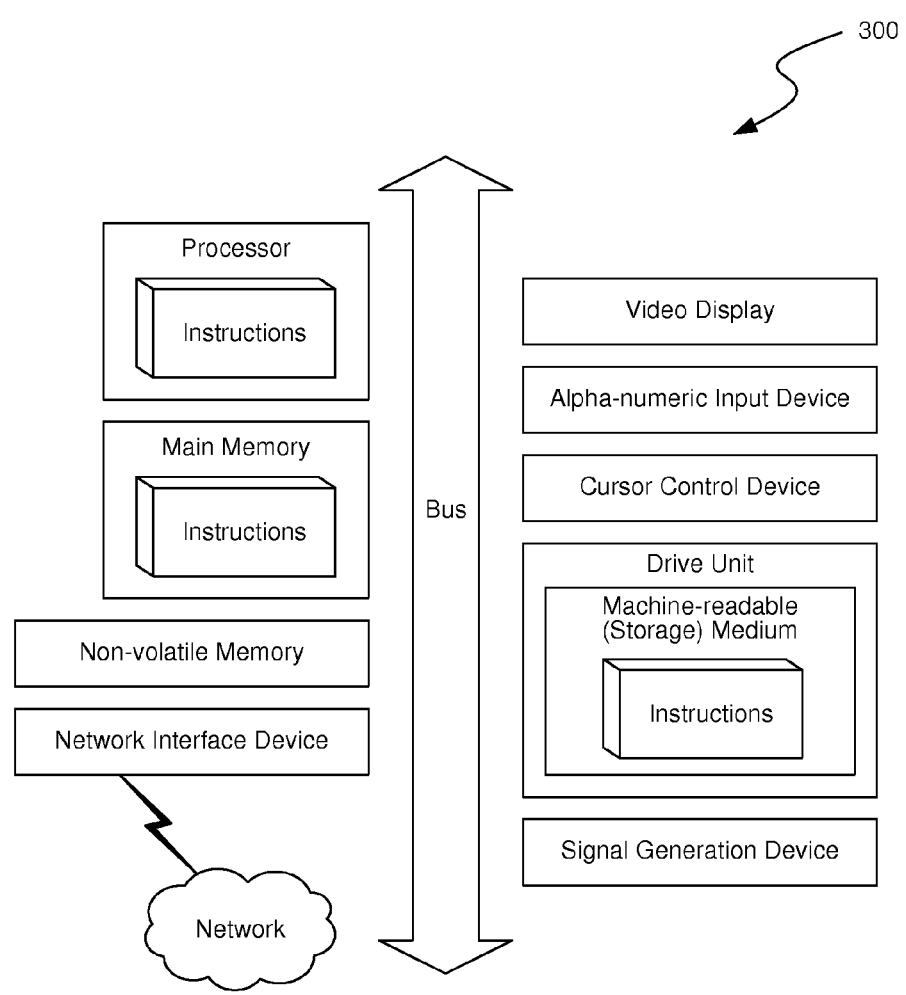
FIG. 3 is a block diagram illustrating an exemplary machine in the example form of a computer system within which a set of instructions, for causing the machine to perform any one or more of the methodologies discussed herein, may be executed, according to yet another embodiment of the subject matter described herein.

FIG. 3 shows a diagrammatic representation of a machine in the example form of a computer system within which a set of instructions, for causing the machine to perform any one or more of the methodologies discussed herein, may be executed.

In the example of FIG. 3, the computer system 300 includes a processor, memory, non-volatile memory, and an interface device. Various common components (e.g., cache memory) are omitted for illustrative simplicity. The computer system 300 is intended to illustrate a hardware device on which any of the components depicted in the example of FIGS. 2A-2D (and any other components described in this specification) can be implemented. The computer system 300 can be of any applicable known or convenient type. The components of the computer system 300 can be coupled together via a bus or through some other known or convenient device.

The processor may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 300. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system. The interface can include an analog modem, isdn modem, cable modem, token ring interface, satellite transmission interface (e.g. "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 8 reside in the interface.

In operation, the computer system 300 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Figure 4:
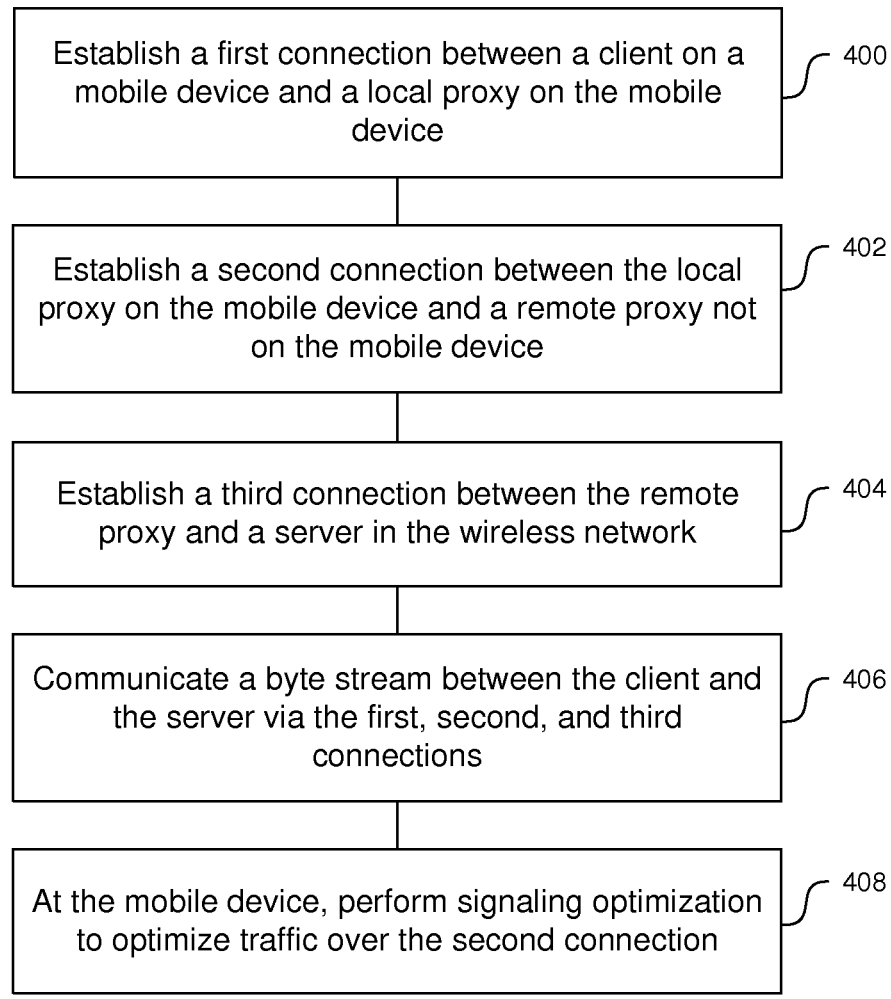
FIG. 4 is a flow chart illustrating an exemplary process for signaling optimization in a wireless network utilizing proprietary and non-proprietary protocols according to an embodiment of the subject matter described herein.

FIG. 4 is a flow chart illustrating an exemplary process for signaling optimization in a wireless network utilizing proprietary and non-proprietary protocols according to an embodiment of the subject matter described herein. In the embodiment illustrated in FIG. 4, the process includes establishing a first connection between a client on a mobile device and a local proxy on the mobile device (step 400), establishing a second connection between the local proxy and a remote proxy not located on the mobile device (step 402), establishing a third connection between the proxy server and a server in a wireless network (step 404), communicating a byte stream between the client and the server via the first, second, and third connections (step 406), and performing, by the mobile device, signaling optimization to optimize traffic over the second connection (step 408.)

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112, ¶13, other aspects may likewise be embodied as a means-plus-function claim, or in other forms, such as being embodied in a computer-readable medium. (Any claims intended to be treated under 35 U.S.C. § 112, ¶13 will begin with the words "means for".) Accordingly, the applicant reserves the right to add additional claims after filing the application to pursue such additional claim forms for other aspects of the disclosure.

What is claimed is:

1. A method for signaling optimization in a wireless network utilizing proprietary and non-proprietary protocols, the method comprising:
    establishing a first connection between a client application on a mobile device and a local proxy on the mobile device, wherein the first connection comprises a first Transmission Control Protocol (TCP) session;
    establishing a second connection between the local proxy and a proxy server not located on the mobile device, wherein the second connection comprises a second TCP session;
    establishing a third connection between the proxy server and a server in a wireless network, wherein the third connection comprises a third TCP session;
    communicating a byte stream between the client application and the server via the first, second, and third TCP sessions;
    identifying a pattern of communication within the byte stream using the local proxy wherein the local proxy is unaware of an underlying protocol;
    in response to identifying the pattern of communication within the byte stream, tearing down the second TCP session; and
    replaying the pattern of communication to the client application on behalf of the server using the local proxy.

2. The method of claim 1 wherein the byte stream being communicated between the client application and the server includes at least one of: session traffic, signaling traffic, and streaming data.

3. The method of claim 1 wherein identifying the pattern of communication within the byte stream comprises identifying a repeated communication involving the client application and the server.

4. The method of claim 3 wherein the repeated communication includes a transaction between the client application and the server.

5. The method of claim 1 including detecting that the pattern of communication between the client application and server has changed, and, in response to detecting that the pattern of communication has changed, re-establishing the second connection between the local proxy and the proxy server and suspending a generation of traffic on behalf of the client application and server.

6. The method of claim 1, wherein the server is at least one of a messaging server, an application server, and a content server.

7. A system for signaling optimization in a wireless network utilizing proprietary and non-proprietary protocols, the system comprising:
- a mobile device that includes a client application and a local proxy, the client application and local proxy connected by a first connection, wherein the first connection comprises a first Transmission Control Protocol (TCP) session;
- a proxy server not located on the mobile device and connected to the local proxy by a second connection, wherein the second connection comprises a second TCP session; and
- a server in a wireless network and connected to the proxy server by a third connection, wherein:
- the third connection comprises a third TCP session;
- a byte stream is communicated between the client application and the server via the first, second, and third TCP sessions;
- the local proxy is unaware of an underlying protocol;
- the local proxy identifies a pattern of communication within the byte stream, responds by tearing down the second TCP session, and replays the pattern of communication to the client application on behalf of the server.

8. The system of claim 7 wherein the byte stream being communicated between the client application and the server includes at least one of: session traffic, signaling traffic, and streaming data.

9. The system of claim 7 wherein identifying the pattern of communication within the byte stream comprises identifying a repeated communication involving the client application and the server.

10. The system of claim 9 wherein the repeated communication includes a transaction between the client application and the server.

11. The system of claim 7 including detecting that a pattern of communication between the client application and server has changed, and, in response to detecting that the pattern of communication has changed, re-establishing the second connection between the local proxy and the proxy server and suspending a generation of traffic on behalf of the client application and server.

12. The system of claim 7, wherein the server is at least one of a messaging server, an application server, and a content server.

13. A computer program product for signaling optimization in a wireless network utilizing proprietary and non-proprietary protocols, the computer program product comprising:
- a non-transitory computer readable storage medium having computer readable code embodied therewith, the computer readable code comprising:
- computer readable program code configured for:
- establishing a first connection between a client application on a mobile device and a local proxy on the mobile device, wherein the first connection comprises a first Transmission Control Protocol (TCP) session;
- establishing a second connection between the local proxy and a proxy server not located on the mobile device, wherein the second connection comprises a second TCP session;
- establishing a third connection between the proxy server and a server in a wireless network, wherein the third connection comprises a third TCP session;
- communicating a byte stream between the client application and the server via the first, second, and third TCP sessions;
- identifying a pattern of communication within the byte stream using the local proxy wherein the local proxy is unaware of an underlying protocol;
- in response to identifying the pattern of communication within the byte stream, tearing down the second TCP session; and
- replaying the pattern of communication to the client application on behalf of the server using the local proxy.

14. The computer program product of claim 13 wherein the byte stream being communicated between the client application and the server includes at least one of: session traffic, signaling traffic, and streaming data.

15. The computer program product of claim 13, wherein the server is at least one of a messaging server, an application server, and a content server.

* * * * *